(12) United States Patent
Wu et al.

(10) Patent No.: US 11,903,003 B2
(45) Date of Patent: Feb. 13, 2024

(54) METHOD AND DEVICE USED IN UE AND BASE STATION FOR WIRELESS COMMUNICATION

(71) Applicants: Lu Wu, Shanghai (CN); Xiaobo Zhang, Shanghai (CN); Lin Yang, Shanghai (CN)

(72) Inventors: Lu Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 412 days.

(21) Appl. No.: 17/358,008

(22) Filed: Jun. 25, 2021

(65) Prior Publication Data

US 2021/0329649 A1  Oct. 21, 2021

Related U.S. Application Data

(63) Continuation of application No. PCT/CN2019/122728, filed on Dec. 3, 2019.

(30) Foreign Application Priority Data

Dec. 28, 2018 (CN) .......................... 201811622787.X

(51) Int. Cl.
*H04W 72/53* (2023.01)
*H04L 27/26* (2006.01)
(Continued)

(52) U.S. Cl.
CPC ........... *H04W 72/53* (2023.01); *H04L 5/0051* (2013.01); *H04L 27/26025* (2021.01);
(Continued)

(58) Field of Classification Search
CPC ............. H04W 72/53; H04W 72/0453; H04W 72/0473; H04W 72/23; H04W 52/16;
(Continued)

(56) References Cited

U.S. PATENT DOCUMENTS

2018/0235005 A1* 8/2018 Ansari ............. H04W 74/0808
2018/0255578 A1* 9/2018 Kim ........................ H04L 5/001
(Continued)

FOREIGN PATENT DOCUMENTS

| CN | 104378830 A | 2/2015 |
|---|---|---|
| CN | 105766031 A | 7/2016 |

(Continued)

OTHER PUBLICATIONS

ISR received in application No. PCT/CN2019/122728 dated Feb. 12, 2020.
(Continued)

*Primary Examiner* — Abdullahi Ahmed

(57) ABSTRACT

The present disclosure provides a method and a device used in User Equipment (UE) and base station for wireless communication. The UE receives first information, the first information being used to indicate M frequency-domain resource blocks in N frequency subbands; performs a channel access detection on the N frequency subbands, the channel access detection is used to determine that $N_1$ frequency subband(s) out of the N frequency subbands is(are) idle; then transmits a first radio signal in $M_1$ frequency-domain resource block(s) in the $N_1$ frequency subband(s); the $M_1$ frequency-domain resource block(s) is(are) $M_1$ frequency-domain resource block(s) belonging to the $N_1$ frequency subband(s) in the M frequency-domain resource block(s); any two of the N frequency subbands are orthogonal, and any two of the M frequency-domain resource blocks
(Continued)

are orthogonal in frequency domain; a first power value is used to determine transmit power of the first radio signal.

20 Claims, 6 Drawing Sheets

(51) Int. Cl.
*H04L 5/00* (2006.01)
*H04W 72/0453* (2023.01)
*H04W 72/044* (2023.01)
*H04W 72/23* (2023.01)

(52) U.S. Cl.
CPC ... *H04W 72/0453* (2013.01); *H04W 72/0473* (2013.01); *H04W 72/23* (2023.01)

(58) Field of Classification Search
CPC ............. H04W 74/0808; H04W 16/14; H04W 52/146; H04L 5/0051; H04L 27/26025; H04L 5/0044; H04L 5/001; H04L 5/0053
See application file for complete search history.

(56) References Cited

U.S. PATENT DOCUMENTS

| | | | | |
|---|---|---|---|---|
| 2019/0159252 A1* | 5/2019 | Xu | ...................... | H04L 27/2636 |
| 2019/0335385 A1* | 10/2019 | Zhang | ................... | H04L 5/0046 |
| 2020/0204327 A1* | 6/2020 | Jia | ..................... | H04W 72/0453 |
| 2020/0236708 A1* | 7/2020 | Li | ......................... | H04W 72/23 |
| 2020/0336927 A1* | 10/2020 | Zhang | .............. | H04W 72/0446 |
| 2020/0412501 A1* | 12/2020 | Zhang | .............. | H04W 74/0808 |
| 2022/0132564 A1* | 4/2022 | Ouchi | ............... | H04W 72/0453 |
| 2022/0353792 A1* | 11/2022 | Zhang | ................... | H04L 5/0007 |
| 2023/0246769 A1* | 8/2023 | Wu | .................. | H04W 72/0453 370/330 |

FOREIGN PATENT DOCUMENTS

| | | |
|---|---|---|
| CN | 106455087 A | 2/2017 |
| CN | 106538017 A | 3/2017 |
| CN | 108366413 A | 8/2018 |
| CN | 109039556 A | 12/2018 |

OTHER PUBLICATIONS

Ericsson "MAC Impact with Multiple Active BWPs, Tdoc R2-1817970" 3GPP TSG-RAN WG2 #104, Nov. 16, 2018.
First Office Action of Chinses patent application No. CN201811622787.X dated Mar. 22, 2022.
First Search Report of Chinses patent application No. CN201811622787.X dated Mar. 4, 2022.
Second Office Action of Chinses patent application No. CN201811622787.X dated Aug. 12, 2022.
Huawei, HiSilicon "Coexistence and channel access for NR unlicensed band operations" 3GPP TSG RAN WG1 Meeting #95 R1-1812194 Nov. 16, 2018.
Channel Access Procedures "Design considerations on channel accessing" 3GPP TSG-RAN WG1 Meeting #94 Bis R1-1811625 Aug. 12, 2018.
3rd Generation Partnership Project; Technical Specification Group Radio Access Network;NR;Physical layer procedures for control (Release 15) Oct. 1, 2018.

* cited by examiner

METHOD AND DEVICE USED IN UE AND BASE STATION FOR WIRELESS COMMUNICATION

CROSS REFERENCE TO RELATED APPLICATIONS

This application is a continuation of International Application No. PCT/CN2019/122728, filed Nov. 3, 2019, claims the priority benefit of Chinese Patent Application No. 201811622787.X, filed on Dec. 28, 2018, the full disclosure of which is incorporated herein by reference.

BACKGROUND

Technical Field

The present disclosure relates to transmission methods and devices in wireless communication systems, and in particular to a communication method and device supporting data transmission on Unlicensed Spectrum.

Related Art

In traditional 3rd Generation Partner Project (3GPP) Long-term Evolution (LTE) systems, data transmission can only be performed on licensed spectrum, however, as traffic enlarges rapidly, especially in some cities and regions, licensed spectrum may hardly meet the requirements of increasing traffic. Communications on Unlicensed Spectrum in Release 13 and Release 14 are introduced into cellular systems and used for downlink and uplink data transmission. To ensure compatibility with other access technologies on Unlicensed Spectrum, Listen Before Talk (LBT) technology is adopted by Licensed Assisted Access (LAA) of LTE to avoid interferences incurred by multiple transmitters occupying same frequency resources simultaneously. The LBT in LTE system is usually wideband, which means that the bandwidth of the LBT is the same as the bandwidth of a Component Carrier (CC).

A system at Phase 1 of 5G New Radio (NR) Access Technology can support User Equipment (UEs) with different receiving bandwidth and transmitting bandwidth capabilities. When a UE with a larger bandwidth capability is in communications with a cell, the UE can perform downlink reception or uplink transmission on CC or Bandwidth Part (BWP) with a larger bandwidth Currently, 5G NR's access technology of Unlicensed Spectrum is under discussion, where a relation between the bandwidth of LBT and CC or BWP is one of key issues.

SUMMARY

Inventors find through researches that, in uplink transmission on Unlicensed Spectrum of NR system, how to increase channel access opportunities to effectively realize the sharing of Unlicensed Spectrum resources by multiple transmitting nodes is a key issue to be solved.

To address the above problem, the present disclosure provides a solution. It should be noted that, in the case of no conflict, the embodiments of the present disclosure and the features in the embodiments may be combined with each other arbitrarily.

The present disclosure discloses a method in a UE for wireless communications, comprising:

receiving first information, the first information being used to indicate M frequency-domain resource blocks in N frequency subbands; and performing a channel access detection on the N frequency subbands, the channel access detection being used to determine that $N_1$ frequency subband(s) out of the N frequency subbands is(are) idle; and transmitting a first radio signal in $M_1$ frequency-domain resource block(s) in the $N_1$ frequency subband(s);

herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$, N is a positive integer number greater than 1, M is a positive integer greater than 1, $N_1$ is a positive integer not greater than the N, and $M_1$ is a positive integer not greater than the M.

In one embodiment, a problem to be solved in the present disclosure is: when a bandwidth of a CC (or BWP) in NR system is large, and if a wideband LBT in LTE system is adopted, that is, the bandwidth of LBT is the same as the bandwidth of the CC (or BWP), then the large LBT bandwidth will lead to low channel access opportunities. In order to improve channel access opportunities to realize the sharing of unlicensed spectrum resources by multiple transmitting nodes more effectively, and in the case of a bandwidth is larger than the bandwidth specified in regulatory requirements (e.g., 20 MHz for 5 GHz carrier frequency), a narrowband LBT (i.e., a bandwidth less than CC (or BWP) or an LBT bandwidth is less than a transmission bandwidth of a radio signal) is selected to increase channel access opportunities, so that uplink transmission in the case of narrowband LBT is a key issue to be solved.

In one embodiment, a problem to be solved in the present disclosure is: a narrowband LBT (i.e., its bandwidth is less than CC (or BWP) or less than a transmission bandwidth of a radio signal) can improve channel access opportunities. When an uplink transmission in NR system is scheduled to occupy multiple narrowbands (BWPs or subbands), the UE may only be allowed to perform uplink transmissions in part of scheduled narrowbands through the narrowband LBT, while in scheduled narrowbands that LBT fails, the UE cannot perform uplink transmission. However, a base station may not be able to accurately judge whether transmission failure in these narrowbands is incurred by poor channel conditions or UE's failure in transmitting a radio signal. In order to ensure that the base station can continue to perform uplink power control accurately, the uncertainty of the base station should be taken into account when designing transmit power of uplink transmissions. Therefore, transmit power of uplink transmissions in narrowband LBT is a key issue to be solved.

In one embodiment, the above method is essential in that N frequency subbands are respectively N narrowbands (BWPs (or subbands)) in a CC (or BWP), the UE performs narrowband LBT respectively in N narrowbands to judge that only channel(s) in $N_1$ narrowband(s) out of N narrowbands is(are) idle; the UE transmits an uplink radio signal in only $N_1$ narrowband(s) out of N narrowbands, and transmit power of the uplink radio signal is related to frequency-domain resources occupied by actual transmission instead of scheduled frequency-domain resources. The above method is advantageous in that, compared with wideband LBT, narrowband LBT effectively improves channel access opportunities; since retransmission may only be performed for radio signals in LBT-failed narrowband, thus narrowband LBT also improves uplink transmission efficiency; besides, transmit power of uplink radio signals in the above method is related to frequency-domain resources occupied by actual transmission, which takes the base station's uncertainty of transmission failure reasons on part of narrowbands into account, thus ensuring that the base station can continue to perform uplink power control accurately.

According to one aspect of the present disclosure, the above method is characterized in comprising:

transmitting a second radio signal;

herein, the second radio signal is used to carry a second power value; the first power value and the $N_1$ are used together to determine the second power value, or, the first power value and the $M_1$ are used together to determine the second power value.

In one embodiment, a problem to be solved in the present disclosure is: in the existing LTE system, a Power Headroom Report (PHR) is used by the base station for acquiring differences between maximum transmit power and actual transmit power of the UE. In the case of narrowband LBT, transmit power of uplink radio signal is related to frequency-domain resources occupied by actual transmission, and due to base station's uncertainty of transmission failure reasons on part of narrowbands, the calculation method of the PHR needs to take the situation that uplink radio signals cannot be transmitted in part of narrowbands incurred by failure of narrowband LBT into account.

In one embodiment, the above method is essential in that a second power value is a PHR, a first power value is actual transmit power, in the case of narrowband LBT, part of scheduled narrowbands may not be able to transmit uplink radio signals due to the failure of LBT, so power reserved for these narrowbands should be compensated in the calculation of the PHR, or, the calculation of the PHR should be transmit power on scheduled resources instead of actual transmit power. The above method is advantageous in that the mentioned PHR calculation method takes the base station's uncertainty of transmission failure reasons in part of narrowbands into account, thus ensuring that the base station can continue to perform uplink power control accurately.

According to one aspect of the present disclosure, the above method is characterized in that the first power value is linearly correlated with a first component; the $N_1$ and the N are used to determine the first component; or, the $M_1$ and the M are used to determine the first component; or, the $M_1$ and a Subcarrier Spacing (SCS) of subcarriers occupied by the first radio signal are used to determine the first component.

According to one aspect of the present disclosure, the above method is characterized in that the second power value is linearly correlated with both the first power value and a first parameter; the $N_1$ and the N are used to determine the first parameter, or, the $M_1$ and the M are used to determine the first parameter.

According to one aspect of the present disclosure, the above method is characterized in comprising:

receiving a first reference-signal group;

herein, a measurement performed on the first reference-signal group is used to determine a second component, and the first power value is linearly correlated with the second component.

According to one aspect of the present disclosure, the above method is characterized in comprising:

receiving second information;

herein, the second information is used to indicate a linear coefficient of the first power value and the second component.

According to one aspect of the present disclosure, the above method is characterized in comprising:

receiving R piece(s) of third information;

herein, the R piece(s) of third information is(are respectively) used to indicate R first offset(s), a third component is linearly correlated with each of the R first offset(s), and the first power value is linearly correlated with the third component, R being a positive integer.

The present disclosure discloses a method in a base station for wireless communications, comprising:

transmitting first information, the first information being used to indicate M frequency-domain resource blocks in N frequency subbands;

receiving a first radio signal in $M_1$ frequency-domain resource block(s) in the $N_1$ frequency subband(s);

herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

According to one aspect of the present disclosure, the above method is characterized in comprising:

receiving a second radio signal;

herein, the second radio signal is used to carry a second power value; the first power value and the $N_1$ are used together to determine the second power value, or, the first power value and the $M_1$ are used together to determine the second power value.

According to one aspect of the present disclosure, the above method is characterized in that the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component.

According to one aspect of the present disclosure, the above method is characterized in that the second power value is linearly related to both the first power value and a first parameter; the $N_1$ and the N are used to determine the first parameter, or, the $M_1$ and the M are used to determine the first parameter.

According to one aspect of the present disclosure, the above method is characterized in comprising:

transmitting a first reference-signal group;

herein, a measurement performed on the first reference-signal group is used to determine a second component, and the first power value is linearly correlated with the second component.

According to one aspect of the present disclosure, the above method is characterized in comprising:

transmitting second information;

herein, the second information is used to indicate a linear coefficient of the first power value and the second component.

According to one aspect of the present disclosure, the above method is characterized in comprising:

transmitting R piece(s) of third information;

herein, the R piece(s) of third information is(are respectively) used to indicate R first offset(s), a third component is linearly correlated with each of the R first offset(s), the first power value is linearly correlated with the third component, R being a positive integer.

The present disclosure discloses a UE used for wireless communications, comprising:

a first receiver, receiving first information, the first information being used to indicate M frequency-domain resource blocks in N frequency subbands; performing a channel access detection on the N frequency subbands, the channel access detection being used to determine that $N_1$ frequency subband(s) out of the N frequency subbands is(are) idle;

a first transmitter, transmitting a first radio signal in $M_1$ frequency-domain resource block(s) in the $N_1$ frequency subband(s);

herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

The present disclosure discloses a base station used for wireless communications, comprising:

a second transmitter, transmitting first information, the first information being used to indicate M frequency-domain resource blocks in N frequency subbands; and a second receiver, receiving a first radio signal in $M_1$ frequency-domain resource block(s) in the $N_1$ frequency subband(s);

herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the present disclosure has the following advantages over conventional schemes:

when a bandwidth of a CC (or BWP) in NR system is large, and if a wideband LBT in LTE system is adopted, that is, the bandwidth of the LBT is the same as the bandwidth of the CC (or BWP), then the large LBT bandwidth will lead to low channel access opportunities. In order to improve channel access opportunities to realize the sharing of unlicensed spectrum resources by multiple transmitting nodes more effectively, and in the case of a bandwidth is larger than the bandwidth specified in regulatory requirements (e.g., 20 MHz for 5 GHz carrier frequency), a selection of a narrowband LBT (i.e., a bandwidth is less than CC (or BWP) or an LBT bandwidth is less than a transmission bandwidth of a radio signal) can increase channel access opportunities and realize transmission of radio signals as much as possible, which effectively improve utilization of unlicensed spectrum resources and improve system spectrum efficiency. The present disclosure proposes a method of transmit power supporting uplink transmissions in the case of narrowband LBT and a PHR calculation method.

when an uplink transmission in NR system is scheduled to occupy multiple narrowbands (BWPs or subbands), the UE may only be allowed to perform uplink transmissions in part of scheduled narrowbands through narrowband LBT, while in scheduled LBT-failed narrowbands, the UE cannot perform uplink transmission. However, a base station may not be able to accurately judge whether transmission failure in these narrowbands is incurred by poor channel conditions or UE's failure in transmitting a radio signal. The method of transmit power of uplink transmissions proposed in the present disclosure takes the uncertainty of the base station into account, thus ensuring that the base station can continue to perform uplink power control accurately.

in the method of transmit power of uplink transmission proposed in the present disclosure, transmit power of an uplink radio signal is related to frequency-domain resources occupied by actual transmission, which takes the base station's uncertainty of transmission failure reasons on part of narrowbands in the case of narrowband LBT into account, ensuring that the base station can continue to perform uplink power control accurately. In the case of wideband LBT, frequency-domain resources occupied by actual transmission are equal to scheduled frequency-domain resources (LBT succeeds), therefore, the PHR calculation method proposed in the present disclosure is applicable to both the wideband LBT and the narrowband LBT.

in the existing LTE system, the PHR is used by the base station for acquiring differences between maximum transmit power and actual transmit power of the UE. The transmit power of an uplink radio signal in the present disclosure is related to frequency-domain resources occupied by actual transmission, in the case of narrowband LBT, part of scheduled narrowbands may not be able to transmit an uplink radio signal due to the failure of LBT, so power reserved for these narrowbands should be compensated in the calculation of the PHR, or, the calculation of the PHR in the present disclosure is transmit power on scheduled resources instead of actual transmit power. The PHR calculation method mentioned in the present disclosure takes the base station's uncertainty of transmission failure reasons on part of narrowbands into account, thus ensuring that the base station can continue to perform uplink power control accurately. In the case of wideband LBT, frequency-domain resources occupied by actual transmission are equal to scheduled frequency-domain resources (LBT succeeds), therefore, the PHR calculation method proposed in the present disclosure is applicable to both the wideband LBT and the narrowband LBT.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
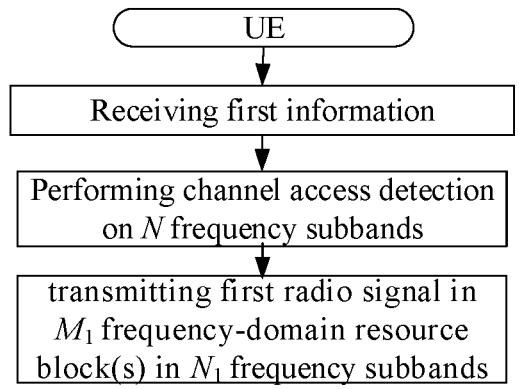
FIG. 1 illustrates a flowchart of first information, a channel access detection and a first radio signal according to one embodiment of the present disclosure.

Embodiment 1 illustrates a flowchart of first information, a channel access detection and a first radio signal, as shown in FIG. 1.

In Embodiment 1, the UE in the present disclosure receives first information, and the first information is used to indicate M frequency-domain resource blocks in N frequency subbands; performs a channel access detection on the N frequency subbands, the channel access detection is used to determine that $N_1$ frequency subband(s) out of the N frequency subbands is(are) idle; transmits a first radio signal in $M_1$ frequency-domain resource block(s) in the $N_1$ frequency subband(s); herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the first information explicitly indicates M frequency-domain resource blocks in N frequency subbands.

In one embodiment, the first information implicitly indicates M frequency-domain resource blocks in N frequency subbands.

In one embodiment, the first information indicates the M frequency-domain resource blocks in the $M_0$ frequency-domain resource blocks, and any of the M frequency-domain resource blocks is one of the $M_0$ frequency-domain resource blocks, $M_0$ being a positive integer not less than M.

In one subembodiment of the above embodiment, numbers of subcarriers respectively comprised in any two of the $M_0$ frequency-domain resource blocks are the same.

In one subembodiment of the above embodiment, any of the $M_0$ frequency-domain resource blocks comprises at least one Physical Resource Block (PRB).

In one subembodiment of the above embodiment, any of the $M_0$ frequency-domain resource blocks comprises at least one consecutive PRB.

In one subembodiment of the above embodiment, any of the $M_0$ frequency-domain resource blocks comprises a PRB.

In one subembodiment of the above embodiment, any of the $M_0$ frequency-domain resource blocks comprises at least one Resource Block (RB).

In one subembodiment of the above embodiment, any of the $M_0$ frequency-domain resource blocks comprises at least one consecutive RB.

In one subembodiment of the above embodiment, any of the $M_0$ frequency-domain resource blocks comprises an RB.

In one subembodiment of the above embodiment, any of the $M_0$ frequency-domain resource blocks comprises at least one consecutive subcarrier.

In one subembodiment of the above embodiment, any of the $M_0$ frequency-domain resource blocks comprises a subcarrier.

In one subembodiment of the above embodiment, a number of subcarriers comprised in any of the $M_0$ frequency-domain resource blocks is equal to a positive integral multiple of 12.

In one subembodiment of the above embodiment, a number of subcarriers comprised in any of the $M_0$ frequency-domain resource blocks is equal to 12.

In one subembodiment of the above embodiment, any of the $M_0$ frequency-domain resource blocks comprises a Resource Block Group (RBG).

In one embodiment, the specific method of the first information indicating the M frequency-domain resource blocks can be found in 3GPP TS38.214, section 6.1.2.2.

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is carried by a MAC CE signaling.

In one embodiment, the first information comprises one or more Information Elements (IEs) in an RRC signaling.

In one embodiment, the first information comprises all or part of an IE in an RRC signaling.

In one embodiment, the first information comprises part of fields of an IE in an RRC signaling.

In one embodiment, the first information comprises multiple IEs in an RRC signaling.

In one embodiment, the first information comprises part or all of fields of a ConfiguredGrantConfig IE in an RRC signaling, and the specific meaning of the ConfiguredGrantConfig IE can be found in 3GPP TS38.331, section 6.3.2.

In one embodiment, the first information comprises a frequencyDomainAllocation field in a ConfiguredGrantConfig IE in an RRC signaling, and the specific meanings of the ConfiguredGrantConfig IE and the frequencyDomainAllocation field can be found in 3GPP TS38.331, section 6.3.2.

In one embodiment, the first information is dynamically configured.

In one embodiment, the first information is carried by a physical-layer signaling.

In one embodiment, the first information is carried by a Downlink Control Information (DCI) signaling.

In one embodiment, the first information is carried by an UpLink GrantDCI signaling.

In one embodiment, the first information comprises a Frequency domain resource assignment field in a DCI signaling, and the specific meaning of the Frequency domain resource assignment field can be found in 3GPP TS38.214, section 6.1.2.2.

In one embodiment, a DCI signaling carrying the first information is DCI format 0_0, the first information comprises a Frequency domain resource assignment field in DCI format 0_0, and specific meanings of the DCI format 0_0 and the Frequency domain resource assignment field can be found in 3GPP TS38.212, section 7.3.1.1.1.

In one embodiment, a DCI signaling carrying the first information is DCI format 0_1, the first information comprises a Frequency domain resource assignment field in DCI format 0_1, and specific meanings of the DCI format 0_1 and the Frequency domain resource assignment field can be found in 3GPP TS38.212, section 7.3.1.1.2.

In one embodiment, the first information is transmitted on a downlink physical layer control channel (i.e., a downlink channel only capable of carrying a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the first information is transmitted on a downlink physical layer data channel (i.e., a downlink channel capable of carrying physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, the N frequency subbands are predefined or configurable.

In one embodiment, the N frequency subbands are predefined.

In one embodiment, the N frequency subbands are configurable.

In one embodiment, frequency-domain resources comprised in any of the N frequency subbands are consecutive.

In one embodiment, any of the N frequency subbands comprises at least one subcarrier.

In one embodiment, any of the N frequency subbands comprises at least one consecutive subcarrier.

In one embodiment, any of the N frequency subbands is of a bandwidth of a positive integral multiple of 20 MHz.

In one embodiment, any two of the N frequency subbands are of equal bandwidth.

In one embodiment, there exist bandwidths of two of the N frequency subbands being different.

In one embodiment, any of the N frequency subbands is of a bandwidth of 20 MHz.

In one embodiment, any of the N frequency subbands is of a bandwidth of 1 GHz.

In one embodiment, any of the N frequency subbands is of a bandwidth of a positive integral multiple of 1 GHz.

In one embodiment, the N frequency subbands belong to a same carrier.

In one embodiment, the N frequency subbands belong to a same BWP.

In one embodiment, the N frequency subbands are respectively N carriers.

In one embodiment, any of the N frequency subbands comprises at least one carrier.

In one embodiment, the N frequency subbands are respectively N BWPs.

In one embodiment, any of the N frequency subbands comprises at least one BWP.

In one embodiment, the N frequency subbands are respectively N subbands.

In one embodiment, any of the N frequency subbands comprises at least one subband.

In one embodiment, the N frequency subbands are deployed at unlicensed spectrum.

In one embodiment, numbers of subcarriers respectively comprised in any two of the M frequency-domain resource blocks are the same.

In one embodiment, any of the M frequency-domain resource blocks comprises at least one PRB.

In one embodiment, any of the M frequency-domain resource blocks comprises at least one consecutive PRB.

In one embodiment, any of the M frequency-domain resource blocks comprises a PRB.

In one embodiment, any of the M frequency-domain resource blocks comprises at least one Resource Block (RB).

In one embodiment, any of the M frequency-domain resource blocks comprises at least one consecutive RB.

In one embodiment, any of the M frequency-domain resource blocks comprises an RB.

In one embodiment, any of the M frequency-domain resource blocks comprises at least one consecutive subcarrier.

In one embodiment, any of the M frequency-domain resource blocks comprises a subcarrier.

In one embodiment, a number of subcarriers comprised in any of the M frequency-domain resource blocks is equal to a positive integral multiple of 12.

In one embodiment, a number of subcarriers comprised in any of the M frequency-domain resource blocks is equal to 12.

In one embodiment, any of the M frequency-domain resource blocks comprises an RBG.

In one embodiment, the M is not less than 3, the M frequency-domain resource blocks are distributed at equal intervals in frequency domain.

In one embodiment, the M is not less than 3, and frequency intervals between any two of the M frequency-domain resource blocks that are adjacent in frequency domain are the same.

In one embodiment, the M is not less than 3, and numbers of subcarriers between any two of the M frequency-domain resource blocks that are adjacent in frequency domain are the same.

In one embodiment, the M is not less than 3, and the M frequency-domain resource blocks are distributed at unequal intervals in frequency domain.

In one embodiment, the M is not less than 3, a first frequency-domain interval is a frequency-domain interval between two of the M frequency-domain resource blocks that are adjacent in frequency domain, a second frequency-domain interval is a frequency-domain interval between two of the M frequency-domain resource blocks that are adjacent in frequency domain, and the first frequency-domain interval is different from the second frequency-domain interval.

In one embodiment, a first subcarrier number is a number of subcarriers between two of the M frequency-domain resource blocks that are adjacent in frequency domain, a second subcarrier number is a number of subcarriers between two of the M frequency-domain resource blocks that are adjacent in frequency domain, and the first subcarrier number is different from the second subcarrier number.

In one embodiment, the $N_1$ is less than the N, and the $M_1$ is less than the M.

In one embodiment, the $N_1$ is equal to the N, and the $M_1$ is equal to the M.

In one embodiment, any of the $M_1$ frequency-domain resource block(s) belongs to one of the $N_1$ frequency subband(s), and any of the $N_1$ frequency subband(s) comprises at least one of the $M_1$ frequency-domain resource block(s).

In one embodiment, any of the N frequency subbands not belonging to the $N_1$ frequency subband(s) does not comprise one of the $M_1$ frequency-domain resource block(s).

In one embodiment, an end time of the channel access detection is not later than a start time for transmitting the first radio signal.

In one embodiment, an end time of the channel access detection is earlier than a start time for transmitting the first radio signal.

In one embodiment, the M frequency-domain resource blocks are allocated to the UE for transmitting a radio signal, and the UE transmits the first radio signal in only $M_1$ frequency-domain resource block(s) in the M frequency-domain resource blocks.

In one embodiment, the M frequency-domain resource blocks are allocated to the UE for transmitting a radio signal, the UE transmits the first radio signal in only $M_1$ frequency-domain resource block(s) of the M frequency-domain resource blocks, the UE drops transmitting a radio signal on M-$M_1$ frequency-domain resource block(s) other than the $M_1$ frequency-domain resource block(s) of the M frequency-domain resource blocks.

In one embodiment, the channel access detection is used to determine that any of the N frequency subbands other than the $N_1$ frequency subband(s) is idle.

In one embodiment, the channel access detection is LBT.

In one embodiment, the channel access detection is Clear Channel Assessment (CCA).

In one embodiment, the channel access detection is uplink access detection.

In one embodiment, the channel access detection is used to determine that the $N_1$ frequency subband(s) can be used by the UE for uplink transmission.

In one embodiment, the channel access detection is used to determine that N—$N_1$ frequency subband(s) cannot be used by the UE for uplink transmission, and the N—$N_1$ frequency subband(s) is(are) each of frequency subband(s) other than the $N_1$ frequency subband(s) in the N frequency subbands.

In one embodiment, the channel access detection comprises N access detections, the N access detections are respectively performed in the N frequency subbands, $N_1$ access detection(s) of the N access detections performed in the $N_1$ frequency subband(s) is(are respectively) used to determine that the $N_1$ frequency subband(s) is(are) idle.

In one subembodiment of the above embodiment, an end time of any of the N access detection(s) is not later than a start time for transmitting the first radio signal.

In one subembodiment of the above embodiment, an end time of any of the N access detection(s) is earlier than a start time for transmitting the first radio signal.

In one subembodiment of the above embodiment, an end time of any of the $N_1$ access detection(s) is not later than a start time for transmitting the first radio signal.

In one subembodiment of the above embodiment, an end time of any of the $N_1$ access detection(s) is earlier than a start time for transmitting the first radio signal.

In one subembodiment of the above embodiment, N—$N_1$ access detection(s) other than the $N_1$ access detection(s) in the N access detections is(are respectively) used to determine that N—$N_1$ frequency subband(s) is(are) non-idle, and the N—$N_1$ frequency subband(s) is(are) each of frequency subband(s) other than the $N_1$ frequency subband(s) in the N frequency subbands.

In one subembodiment of the above embodiment, a given access detection is any of the N access detections, the given access detection is performed in a given frequency subband, the given frequency subband is one of the N frequency subbands, the given access detection comprises respectively performing at least one energy detection in at least one time sub-pool in a given frequency subband to obtain at least one detection value.

In one subembodiment of the above embodiment, a given access detection is any of the $N_1$ access detection(s), the given access detection is performed in a given frequency subband, and the given frequency subband is one of the $N_1$ frequency subband(s), the given access detection comprises respectively performing Q energy detection(s) in Q time sub-pool(s) in a given frequency subband to obtain Q energy detection value(s), Q being a positive integer; Q1 energy detection value(s) in the Q energy detection value(s) is(are) less than a first reference threshold, Q1 being a positive integer not greater than the Q.

In one subembodiment of the above embodiment, any of the N access detections is LBT, and the specific meaning and implementation method of the LBT can be found in 3GPP TR36.889.

In one subembodiment of the above embodiment, any of the N access detection is a Clear Channel Assessment (CCA), and the specific meaning and the implementation method of the CCA can be found in 3GPP TR36.889.

In one subembodiment of the above embodiment, any of the N access detections is uplink access detection.

In one subembodiment of the above embodiment, the $N_1$ access detection(s) is(are respectively) used to determine that the $N_1$ frequency subband(s) can be used by the UE for uplink transmission.

In one subembodiment of the above embodiment, N—$N_1$ access detection(s) other than the $N_1$ access detection(s) in the N access detections is(are respectively) used to determine that N—$N_1$ frequency subband(s) cannot be used by the UE for uplink transmission, and the N—$N_1$ frequency subband(s) is(are) each of frequency subband(s) other than the $N_1$ frequency subband(s) in the N frequency subbands.

In one subembodiment of the above embodiment, any of the N access detections is realized by the method defined in 3GPP TS36.213, section 15.2.

In one embodiment, the first radio signal comprises $N_1$ sub-signal(s), and the $N_1$ sub-signal(s) is(are respectively) transmitted in the $N_1$ frequency subband(s).

In one embodiment, frequency-domain resources occupied by the $M_1$ frequency-domain resource block(s) comprise frequency-domain resources occupied by the first radio signal.

In one embodiment, the first radio signal comprises at least one of data or a reference signal.

In one embodiment, the first radio signal comprises data.

In one embodiment, the first radio signal comprises a reference signal.

In one embodiment, the first radio signal comprises data and a reference signal.

In one embodiment, the data comprised in the first radio signal is uplink data.

In one embodiment, the reference signal comprised in the first radio signal comprises one or more of a DeModulation Reference Signal (DMRS), a Sounding Reference Signal (SRS), and Phase error Tracking Reference Signals (PTRS).

In one embodiment, the reference signal comprised in the first radio signal comprises an SRS.

In one embodiment, the reference signal comprised in the first radio signal comprises a DMRS.

In one embodiment, the reference signal comprised in the first radio signal comprises a PTRS.

In one embodiment, the first radio signal is transmitted on an uplink random access channel.

In one subembodiment of the present disclosure, the uplink random access channel is a Physical Random Access Channel (PRACH).

In one embodiment, a transmission channel of the first radio signal is an Uplink Shared Channel (UL-SCH).

In one embodiment, the first radio signal is transmitted on an uplink physical layer data channel (i.e., an uplink channel capable of carrying physical layer data).

In one subembodiment of the above embodiment, the uplink physical layer data channel is a Physical Uplink Shared CHannel (PUSCH).

In one subembodiment, the uplink physical layer data channel is a sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the above method also comprises:
receiving fourth information;
herein, the fourth information is used to indicate scheduling information of the first radio signal.

In one subembodiment of the above embodiment, scheduling information of the first radio signal comprises at least one of occupied time-domain resources, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), a transmitting antenna port, corresponding multi-antenna associated transmitting, or corresponding multi-antenna associated receiving.

In one subembodiment of the above embodiment, the configuration information of the DMRS comprised in scheduling information of the first radio signal comprises at least one of a Reference Signal (RS) sequence, a mapping mode, a DMRS type, occupied time-domain resources, occupied frequency-domain resources, occupied code-domain resources, a cyclic shift or an Orthogonal Cover Code (OCC).

In one subembodiment of the above embodiment, the fourth information and the first information belong to a same IE in an RRC signaling.

In one subembodiment of the above embodiment, the fourth information is carried by a MAC CE signaling.

In one subembodiment of the above embodiment, the fourth information and the first information are carried by a same DCI signaling.

In one embodiment, the multi-antenna associated reception is Spatial Rx parameters.

In one embodiment, the multi-antenna associated reception is a reception beam.

In one embodiment, the multi-antenna associated reception is a reception beamforming matrix.

In one embodiment, the multi-antenna associated reception is a reception analog beamforming matrix.

In one embodiment, the multi-antenna associated reception is a reception analog beamforming vector.

In one embodiment, the multi-antenna associated reception is a reception beamforming vector.

In one embodiment, the multi-antenna associated reception is reception spatial filtering.

In one embodiment, the multi-antenna associated transmission is Spatial Tx parameters.

In one embodiment, the multi-antenna associated transmission is a transmission beam.

In one embodiment, the multi-antenna associated transmission is a transmission beamforming matrix.

In one embodiment, the multi-antenna associated transmission is a transmission analog beamforming matrix.

In one embodiment, the multi-antenna associated transmission is a transmission analog beamforming vector.

In one embodiment, the multi-antenna associated transmission is a transmission beamforming vector.

In one embodiment, the multi-antenna associated transmission is transmission spatial filtering.

In one embodiment, the Spatial Tx parameters include one or more of a transmission antenna port, a transmission antenna port group, a transmission beam, a transmission analog beamforming matrix, a transmission analog beamforming vector, a transmission beamforming matrix, a transmission beamforming vector and transmission spatial filtering.

In one embodiment, Spatial Rx parameters includes one or more of a reception beam, a reception analog beamforming matrix, a reception analog beamforming vector, a reception beamforming matrix, a reception beamforming vector and reception spatial filtering.

In one embodiment, a first power value being used to determine transmit power of the first radio signal means that transmit power of the first radio signal is a smaller value of a first limiting power value and the first power value.

In one embodiment, a first power value being used to determine transmit power of the first radio signal refers to $P_{PUSCH,b,f,c}(i,j,q_d,l)=\min(P_{CMAX,f,c}(i)-P_1)$; herein, $P_{PUSCH,b,f,c}(i,j,q_d,l)$, $P_{CMAX,f,c}(i)$ and $P_1$ are respectively transmit power of the first radio signal, the first limiting power value and the first power value.

In one subembodiment of the above embodiment, the first limiting power value is greater than the first power value, and transmit power of the first radio signal is the first power value.

In one subembodiment of the above embodiment, the first limiting power value is less than the first power value, and transmit power of the first radio signal is the first limiting power value.

In one subembodiment of the above embodiment, the first limiting power value is equal to the first power value, and transmit power of the first radio signal is the first limiting power value or the first power value.

In one embodiment, transmit power of the first radio signal is measured by dBm.

In one embodiment, transmit power of the first radio signal is $P_{PUSCH,b,f,c}(i,j,q_d,l)$, and the specific meaning of the $P_{PUSCH,b,f,c}(i,j,q_d,l)$ can be found in TS38.213, section 7.1.1.

In one embodiment, the first limiting power value is measured by dBm.

In one embodiment, the first limiting power value is pre-defined.

In one embodiment, the first limiting power value is configurable.

In one embodiment, the first limiting power value is maximum transmit power of a carrier corresponding to the first radio signal, a transmission occasion and a serving cell.

In one embodiment, the first limiting power value is maximum transmit power of the first radio signal of a carrier, a transmission occasion and a serving cell corresponding to the first radio signal.

In one embodiment, the first limiting power value is $P_{CMAX,f,c}(i)$ the $P_{CMAX,f,c}(i)$ is maximum transmit power of the UE in an i-th PUSCH transmission occasion on a carrier f in a serving cell indexed as c; the first radio signal is transmitted in an i-th transmission occasion on a carrier f in a serving cell indexed as c; and the specific meaning of the $P_{CMAX,f,c}(i)$ can be found in TS38.213, section 7.1.1.

In one embodiment, the first limiting power value is $P_{CMAX,f,c}(i)$, the $P_{CMAX,f,c}(i)$ is transmit power of the UE configured in an i-th transmission occasion on a carrier f in a serving cell indexed as c; the first radio signal is transmitted in an i-th transmission occasion on a carrier f in a serving cell indexed as c; and the specific meaning of the $P_{CMAX,f,c}(i)$ can be found in TS38.213, section 7.1.1.

In one embodiment, the first power value is measured by dBm.

In one embodiment, the first power value is related to the $N_1$.

In one embodiment, the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component.

In one embodiment, the first power value is related to the $N_1$; the first power value is linearly correlated with a first component; and the $N_1$ and the N are used to determine the first component.

In one embodiment, the first power value is related to the $M_1$.

In one embodiment, the first power value is related to the $M_1$; the first power value is linearly correlated with a first component; and the $M_1$ and the M are used to determine the first component.

In one embodiment, the first power value is related to the $M_1$; the first power value is linearly correlated with a first component; the $M_1$ and an SCS of subcarriers occupied by the first radio signal are used to determine the first component.

In one embodiment, the first component is measured by dB.

In one embodiment, the first component is equal to a base-10 logarithm of a linear value of the first component multiplied by 10.

Embodiment 2

Figure 2:
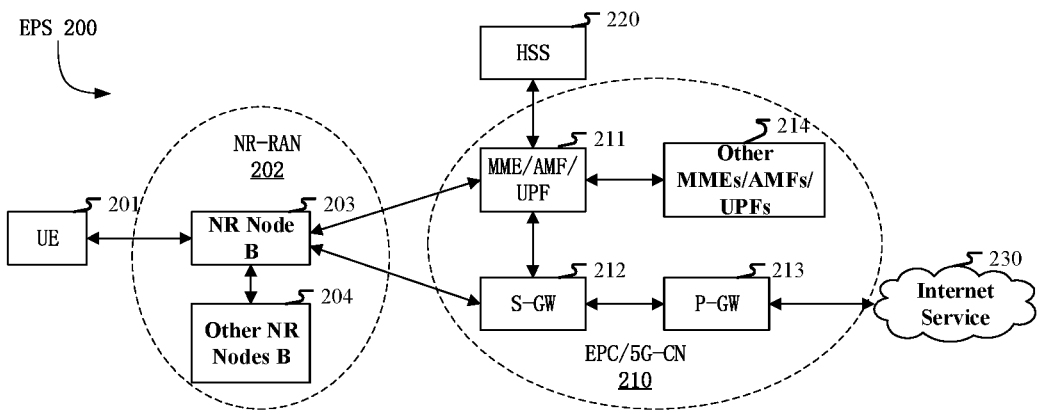
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The NR 5G or LTE network architecture 200 may be called an Evolved Packet System (EPS) 200 or some other applicable terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the UE 201 corresponds to the UE in the present disclosure.

In one embodiment, the gNB203 corresponds to the base station in the present disclosure.

In one subembodiment, the UE 201 supports wireless communications with data transmitted on unlicensed spectrum.

In one subembodiment, the UE 201 supports wireless communications with data transmitted on licensed spectrum.

In one subembodiment, the gNB203 supports wireless communications with data transmitted on unlicensed spectrum.

In one subembodiment, the gNB203 supports wireless communications with data transmitted on licensed spectrum.

In one subembodiment, the UE 201 supports MIMO-based wireless communications.

In one subembodiment, the gNB203 supports MIMO-based wireless communications.

Embodiment 3

Figure 3:
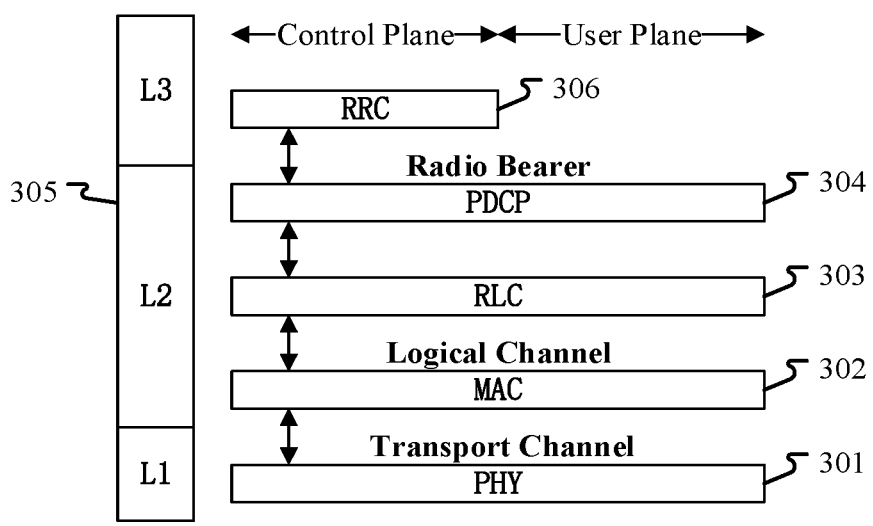
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer data packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the R piece(s) of third information in the present disclosure is generated by the PHY 301.

In one embodiment, the R piece(s) of third information in the present disclosure is generated by the RRC sublayer 306.

In one embodiment, the R piece(s) of third information in the present disclosure is generated by the MAC sublayer 302.

In one embodiment, the fourth information in the present disclosure is generated by the PHY 301.

In one embodiment, the fourth information in the present disclosure is generated by the RRC sublayer 306.

In one embodiment, the fourth information in the present disclosure is generated by the MAC sublayer 302.

In one embodiment, the first reference-signal group in the present disclosure is generated by the PHY 301.

In one embodiment, the channel access detection in the present disclosure is generated by the PHY 301.

In one embodiment, the first radio signal in the present disclosure is generated by the PHY 301.

In one embodiment, the second radio signal in the present disclosure is generated by the PHY 301.

Embodiment 4

Figure 4:
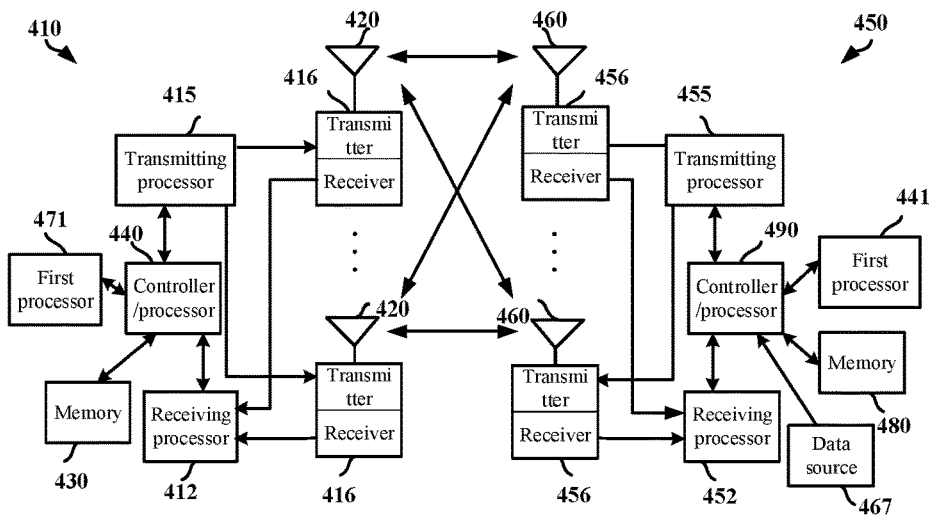
FIG. 4 illustrates a schematic diagram of an NR node and a UE according to one embodiment of the present disclosure.

Embodiment 4 illustrates a schematic diagram of a base station and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a first processor 471, a transmitting processor 415, a transmitter/receiver 416 and an antenna 420.

The UE (450) comprises a controller/processor 490, a memory 480, a data source 467, a first processor 441, a transmitting processor 455, a receiving processor 452, a transmitter/receiver 456 and an antenna 460.

In downlink (DL) transmission, processes relevant to the base station (410) include the following:

a higher layer packet is provided to the controller/processor 440, the controller/processor 440 provides header compression, encryption, packet segmentation and reordering, and a multiplexing between a logical channel and a transport channel so as to implement the L2 layer protocols used for the user plane and the control plane; a higher layer packet may include data or control information, such as a Downlink Shared Channel (DL-SCH);

the controller/processor 440 is connected to the memory 430 that stores program codes and data, the memory 430 may be called a computer readable medium;

the controller/processor 440 comprises scheduling units for transmission requests, the scheduling units are used for scheduling radio resources corresponding to transmission requests;

the first processor 471 determines first information;

the transmitting processor 415 receives a bit stream output from the controller/processor 440, and performs signal transmitting processing functions of the L1 layer (that is, PHY), including coding, interleaving, scrambling, modulation, power control/allocation and generation of physical layer control signaling (such as PBCH, PDCCH, PHICH, PCFICH, reference signal), etc.;

the transmitting processor 415 receives a bit stream output from the controller/processor 440, and performs signal transmitting processing functions of the L1 layer (that is, PHY), including multi-antenna transmission, spreading, code division multiplexing, and precoding;

the transmitter 416 is configured to convert the baseband signal provided by the transmitting processor 415 into a radio frequency signal to be transmitted via the antenna 420; each transmitter 416 performs sampling processing on respective input symbol streams to acquire respective sampled signal streams; each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

the receiver 456 is configured to convert the radio frequency signal received by the antenna 460 into a baseband signal and provide the baseband signal to the receiving processor 452;

the receiving processor 452 implements various signal receiving processing functions used for the L1 layer (that is, PHY), including decoding, deinterleaving, descrambling, demodulation and extraction of physical layer control signaling;

the receiving processor 452 implements various signal receiving processing functions used for the L1 layer (that is, PHY), including multi-antenna reception, dispreading, code division multiplexing, and precoding;

the first processor 441 determines first information;

the controller/processor 490 receives a bit stream output from the receiving processor 452, provides header decompression, decryption, packet segmentation and reordering as well as a multiplexing and demultiplexing between a logical channel and a transport channel so as to implement the L2 layer protocols for the user plane and the control plane;

the controller/processor 490 is connected to the memory 480 that stores program codes and data. The memory 480 may be called a computer readable medium.

In uplink (UL) transmission, processes relevant to the base station (410) include the following:

The receiver 416 receives a radio frequency signal via a corresponding antenna 420, converts the received radio frequency signal into a baseband signal, and provides the baseband signal to the receiving processor 412;

the receiving processor 412 performs various signal receiving processing functions for the L1 layer (that is, PHY), including decoding, deinterleaving, descrambling, demodulation and extraction of physical layer control signaling;

the receiving processor 412 performs various signal receiving processing functions for the L1 layer (that is, PHY), including multi-antenna reception, despreading, code division multiplexing, and precoding, etc.;

the controller/processor 440 implements the functionality of the L2 layer, and is connected to the memory 430 that stores program codes and data;

the controller/processor 440 provides demultiplexing between a transport channel and a logical channel, packet reassembling, decryption, header decompression, and control signal processing to recover a higher layer packet coming from the UE 450; a higher layer packet from the controller/processor 440 can be provided to the core network;

the first processor 471 determines to receive a first radio signal in $M_1$ frequency-domain resource block(s) in $N_1$ frequency subband(s);

in UL (Uplink), processes relevant to the UE (450) include the following:

The data source 467 provides a higher layer packet to the controller/processor 490. The data source 467 represents all protocol layers above the L2 layer;

the transmitter 456 transmits a radio frequency signal via a corresponding antenna 460, converting the baseband signal into a radio frequency signal, and providing the radio frequency signal to a corresponding antenna 460;

the transmitting processor 455 performs various signal receiving processing functions for the L1 layer (that is, PHY), including coding, interleaving, scrambling, modulation and physical layer signaling generation;

the transmitting processor 455 performs various signal receiving processing functions for the L1 layer (that is, PHY), including multi-antenna transmission, spreading, code division multiplexing, and precoding;

the controller/processor 490 based on radio resource allocation for the gNB410 performs header compression, encryption, packet segmentation and reordering and multiplexing between a logical channel and a transport channel, so as to implement the L2 functionality used for the user plane and the control plane;

the controller/processor 490 is also in charge of HARQ operation, retransmission of a lost packet, and a signaling to the gNB410;

the first processor 441 determines to transmit a first radio signal in $M_1$ frequency-domain resource block(s) in $N_1$ frequency subband(s).

In one embodiment, the UE 450 comprises at least one processor and at least one memory. at least one processor and at least one memory. The at least one memory comprises computer program codes; the at least one memory and the computer program codes are configured to be used in collaboration with the at least one processor. The UE 450 at least: receives first information, the first information is used to indicate M frequency-domain resource blocks in N frequency subbands; performs a channel access detection on the N frequency subbands, the channel access detection is used to determine that $N_1$ frequency subband(s) out of the N frequency subbands is(are) idle; and transmits a first radio signal in $M_1$ frequency-domain resource block(s) in the $N_1$ frequency subband(s); herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the UE 450 comprises a memory that stores a computer readable instruction program. The computer readable instruction program generates an action when executed by at least one processor. The action includes: receiving first information, the first information being used to indicate M frequency-domain resource blocks in N frequency subbands; performing a channel access detection on the N frequency subbands, the channel access detection being used to determine that $N_1$ frequency subband(s) out of the N frequency subbands is(are) idle; and transmitting a first radio signal in $M_1$ frequency-domain resource block(s) in the $N_1$ frequency subband(s); herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the gNB 410 comprises: at least one processor and at least one memory. The at least one memory comprises computer program codes; the at least one memory and the computer program codes are configured to be used in collaboration with the at least one processor. The gNB 410 at least: transmits first information, the first information is used to indicate M frequency-domain resource blocks in N frequency subbands; and receives a first radio signal in $M_1$ frequency-domain resource block(s) in the $N_1$ frequency subband(s); herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the gNB 410 comprises a memory that stores a computer readable instruction program. The computer readable instruction program generates an action when executed by at least one processor. The action includes: transmitting first information, the first information being used to indicate M frequency-domain resource blocks in N frequency subbands; and receiving a first radio signal in $M_1$ frequency-domain resource block(s) in the $N_1$ frequency subband(s); herein, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the UE 450 corresponds to the UE in the present disclosure.

In one embodiment, the gNB410 corresponds to the base station in the present disclosure.

In one embodiment, at least the first two of the receiver 456, the receiving processor 452 and the controller/processor 490 are used to receive the first information in the present disclosure.

In one embodiment, at least the first two of the transmitter 416, the transmitting processor 415 and the controller/processor 440 are used to transmit the first information in the present disclosure.

In one embodiment, at least the first two of the receiver 456, the receiving processor 452 and the controller/processor 490 are used to receive the second information in the present disclosure.

In one embodiment, at least the first two of the transmitter 416, the transmitting processor 415 and the controller/processor 440 are used to transmit the second information in the present disclosure.

In one embodiment, at least the first two of the receiver 456, the receiving processor 452 and the controller/processor 490 are used to receive the first reference-signal group in the present disclosure.

In one embodiment, at least the first two of the transmitter 416, the transmitting processor 415 and the controller/processor 440 are used to transmit the first reference-signal group in the present disclosure.

In one embodiment, at least the first two of the receiver 456, the receiving processor 452 and the controller/processor 490 are used to receive the R piece(s) of third information in the present disclosure.

In one embodiment, at least the first two of the transmitter 416, the transmitting processor 415 and the controller/processor 440 are used to transmit the R piece(s) of third information in the present disclosure.

In one embodiment, at least the first two of the receiver 456, the receiving processor 452 and the controller/processor 490 are used to receive the fourth information in the present disclosure.

In one embodiment, at least the first two of the transmitter 416, the transmitting processor 415 and the controller/processor 440 are used to transmit the fourth information in the present disclosure.

In one embodiment, at least the first two of the receiver 456, the receiving processor 452 and the controller/processor 490 are used to perform the channel access detection in the present disclosure in the N frequency subbands in the present disclosure.

In one embodiment, at least first two of the transmitter 456, the transmitting processor 455 and the controller/processor 490 are used to transmit the first radio signal in the present disclosure in the $M_1$ frequency-domain resource block(s) in the $N_1$ frequency subband(s) in the present disclosure.

In one embodiment, at least the first two of the receiver 416, the receiving processor 412 and the controller/processor 440 are used to receive the first radio signal in the present disclosure in the $M_1$ frequency-domain resource block(s) in the $N_1$ frequency subband(s) in the present disclosure.

In one embodiment, at least the first two of the transmitter 456, the transmitting processor 455 and the controller/processor 490 are used to transmit the second radio signal in the present disclosure.

In one embodiment, at least the first two of the receiver 416, the receiving processor 412 and the controller/processor 440 are used to receive the second radio signal in the present disclosure.

Embodiment 5

Figure 5:
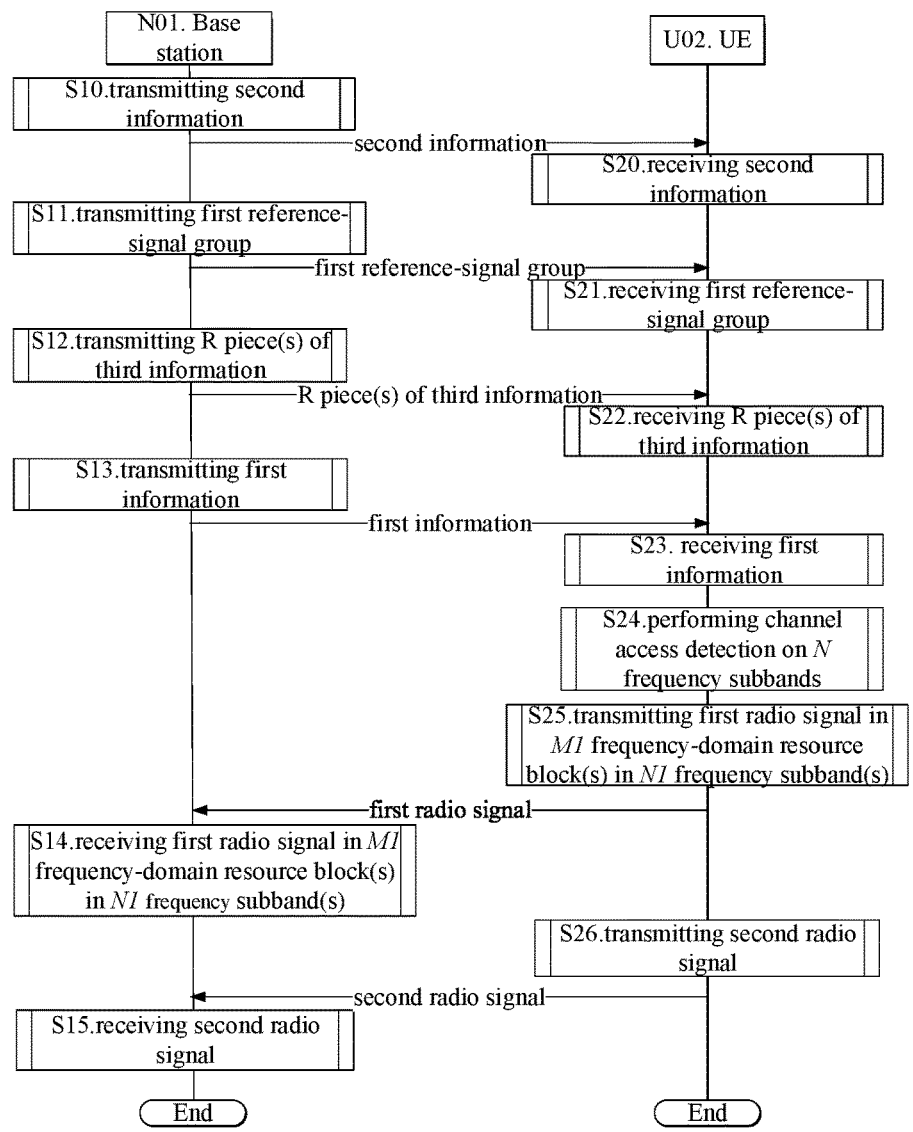
FIG. 5 illustrates a flowchart of wireless transmissions according to one embodiment of the present disclosure.

Embodiment 5 illustrates a flowchart of wireless transmission, as shown in FIG. 5. In FIG. 5, a base station N01 is a maintenance base station for a serving cell of UE U02. In FIG. 5, block F1 is optional.

The N01 transmits second information in step S10; transmits a first reference-signal group in step S11; transmits R piece(s) of third information in step S12; transmits first information in step S13, receives a first radio signal in $M_1$ frequency-domain resource block(s) in $N_1$ frequency subband(s) in step S14; and receives a second radio signal in step S15.

The U02 receives second information in step S20; receives a first reference-signal group in step S21; receives R piece(s) of third information in step S22; receives first information in step S23; performs a channel access detection on N frequency subbands in step S24; transmits a first radio signal in $M_1$ frequency-domain resource block(s) in $N_1$ frequency subband(s) in step S25; and transmits a second radio signal in step S26.

In Embodiment 5, the first information is used to indicate M frequency-domain resource blocks in N frequency subbands; the channel access detections is used by the U02 for determining that $N_1$ frequency subband(s) out of the N frequency subbands is(are) idle; any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used by the U02 for determining transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M. The second radio signal is used to carry a second power value; the first power value and the $N_1$ are used together to determine the second power value, or, the first power value and the $M_1$ are used together to determine the second power value. A measurement performed on the first reference-signal group is used by the U02 to determine a second component, and the first power value is linearly correlated with the second component. The second information is used to indicate a linear coefficient of the first power value and the second component. The R piece(s) of third information is(are respectively) used to indicate R first offset(s), a third component is linearly correlated with each of the R first offset(s), and the first power value is linearly correlated with the third component, R being a positive integer.

In one embodiment, the second radio signal comprises at least one of data, control information or a reference signal.

In one embodiment, the second radio signal comprises data.

In one embodiment, the second radio signal comprises a reference signal.

In one embodiment, the second radio signal comprises data and a reference signal.

In one embodiment, the data comprised in the second radio signal is uplink data.

In one embodiment, the reference signal comprised in the second radio signal comprises one or more of a DeModulation Reference Signal (DMRS), a Sounding Reference Signal (SRS), and Phase error Tracking Reference Signals (PTRS).

In one embodiment, the reference signal comprised in the second radio signal comprises an SRS.

In one embodiment, the reference signal comprised in the second radio signal comprises a DMRS.

In one embodiment, the reference signal comprised in the second radio signal comprises a PTRS.

In one embodiment, the second radio signal is transmitted on an uplink random access channel.

In one subembodiment of the above embodiment, the uplink random access channel is a PRACH.

In one embodiment, a transmission channel for the second radio signal is a UL-SCH.

In one embodiment, the second radio signal is transmitted on an uplink physical layer data channel.

In one subembodiment of the above embodiment, the uplink physical layer data channel is a PUSCH.

In one subembodiment of the above embodiment, the uplink physical layer data channel is an sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the second radio signal comprises a first report, and the first report is used by the N01 to determine the second power value.

In one subembodiment of the above embodiment, the first report comprises a Power Headroom Report (PHR).

In one subembodiment of the above embodiment, the second power value is a Power Headroom (PH).

In one embodiment, the second power value is measured by dB.

In one embodiment, the second power value is a PH.

In one embodiment, the second power value is $PH_{type1,b,f,c}(i,j,q_d,l)$, and the specific meaning of the $PH_{type1,b,f,c}(i,j,q_d,l)$ can be found in TS38.213, section 7.7.1.

In one embodiment, the second power value is linearly correlated with both the first power value and a first parameter; the $N_1$ and the N are used by the U02 to determine the first parameter, or, the $M_1$ and the M are used to determine the first parameter.

In one embodiment, the first power value and the $N_1$ are used together to determine the second power value.

In one embodiment, the first power value is related to the $N_1$, and the first power value and the $N_1$ are used together to determine the second power value.

In one embodiment, the first power value and the $N_1$ are used together to determine the second power value; the second power value is linearly correlated with both the first power value and a first parameter; and the $N_1$ and the N are used by the U02 to determine the first parameter.

In one embodiment, the first power value and the $M_1$ are used together to determine the second power value.

In one embodiment, the first power value is related to the $M_1$, and the first power value and the $M_1$ are used together to determine the second power value.

In one embodiment, the first power value and the $M_1$ are used together to determine the second power value; the second power value is linearly correlated with both the first power value and a first parameter; the $M_1$ and the M are used by the U02 to determine the first parameter.

In one embodiment, the first parameter is measured by dB.

In one embodiment, the first parameter is equal to a base-10 logarithm of a linear value of the first parameter multiplied by 10.

In one embodiment, transmission of the second power value is triggered by a given condition, which comprises at least one of the following:
- a change of K pathloss is greater than a first threshold, K being equal to 1;
- a change of an average value of K pathlosses is greater than a second threshold, K being greater than 1;
- a change of a first pathloss of the K pathlosses is greater than a third threshold, and the first pathloss is one of the K pathlosses with a greatest change;
- a change of a second pathloss in the K pathlosses is greater than a fourth threshold, and the second pathloss is one of the K pathlosses with a smallest change;
- a change of a reference pathloss is greater than a fifth threshold, and the reference pathloss is respectively and linearly correlated with each of the K pathlosses;
- a first timer is finished;
- the UE receives a target signaling, the target signaling is used to trigger transmitting the second power value;
- herein, K is a positive integer, and the K pathlosses are respectively determined by measurements performed on K reference-signal groups.

In one subembodiment of the above embodiment, the target signaling is a dynamic signaling.

In one subembodiment of the above embodiment, the target signaling is a high-layer signaling.

In one subembodiment of the above embodiment, any of the K reference-signal groups consists of at least one reference signal.

In one subembodiment of the above embodiment, the first threshold is fixed or configured by a higher-layer signaling.

In one subembodiment of the above embodiment, the second threshold is fixed or configured by a higher-layer signaling.

In one subembodiment of the above embodiment, the third threshold is fixed or configured by a higher-layer signaling.

In one subembodiment of the above embodiment, the fourth threshold is fixed or configured by a higher-layer signaling.

In one subembodiment of the above embodiment, the fifth threshold is fixed or configured by a higher-layer signaling.

In one subembodiment of the above embodiment, the first timer is a prohibitPHR-Timer.

In one subembodiment of the above embodiment, the first timer is a periodicPHR-Timer.

In one subembodiment of the above embodiment, the first timer is a phr-PeriodicTimer.

In one subembodiment of the above embodiment, the first timer is fixed or configured by a higher-layer signaling.

In one embodiment, a first reference-signal group comprises at least one reference signal.

In one embodiment, a first reference-signal group comprises a reference signal.

In one embodiment, the first reference-signal group comprises at least one of a Channel Status Information Reference Signal (CSI-RS) or a Synchronization Signal Block (SSB).

In one embodiment, the first reference-signal group comprises a CSI-RS.

In one embodiment, the first reference-signal group comprises an SSB.

In one embodiment, the second component is measured by dB.

In one embodiment, the second component is equal to a base-10 logarithm of a linear value of the second component multiplied by 10.

In one embodiment, the second component is a pathloss acquired by a measurement performed on the first reference-signal group.

In one embodiment, a linear coefficient of the first power value and the second component is a real number not less than 0.

In one embodiment, a linear coefficient of the first power value and the second component is a real number greater than 0.

In one embodiment, the second component is $PL_{b,f,c}(q_d)$, a linear coefficient of the first power value and the second component is $\alpha_{b,f,c}(j)$, and the specific meanings of the $PL_{b,f,c}(q_d)$ and the $\alpha_{b,f,c}(j)$ can be found in TS38.213, section 7.1.1.

In one embodiment, the second information explicitly indicates a linear coefficient of the first power value and the second component.

In one embodiment, the second information implicitly indicates a linear coefficient of the first power value and the second component.

In one embodiment, the second information indicates an index of a linear coefficient of the first power value and the second component in at least one coefficient.

In one embodiment, the second information is semi-statically configured.

In one embodiment, the second information is carried by a higher-layer signaling.

In one embodiment, the second information is carried by an RRC signaling.

In one embodiment, the second information is carried by a MAC CE signaling.

In one embodiment, the second information comprises one or more IEs of an RRC signaling.

In one embodiment, the second information comprises all or part of an IE of an RRC signaling.

In one embodiment, the second information comprises part of fields of an IE in an RRC signaling.

In one embodiment, the second information comprises multiple IEs of an RRC signaling.

In one embodiment, the second information comprises msg3-Alpha of a PUSCH-PowerControl IE in an RRC signaling, and the specific meanings of the PUSCH-PowerControl IE and the msg3-Alpha can be found in 3GPP TS38.331, section 6.3.2.

In one embodiment, the second information comprises a p0-PUSCH-Alpha field of a ConfiguredGrantConfig IE in an RRC signaling, and the specific meanings of the ConfiguredGrantConfig IE and the p0-PUSCH-Alpha field can be found in 3GPP TS38.331, section 6.3.2.

In one embodiment, the second information comprises a P0-PUSCH-AlphaSet field of a PUSCH-PowerControl IE in an RRC signaling, and the specific meanings of the PUSCH-PowerControl IE and the P0-PUSCH-AlphaSet field can be found in 3GPP TS38.331, section 6.3.2.

In one embodiment, the second information is transmitted on a downlink physical layer data channel (i.e., a downlink channel capable of carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the second information is also used by the U02 to determine a fourth component, and the first power value is linearly correlated with the fourth component.

In one subembodiment of the above embodiment, the fourth component is measured by dB.

In one subembodiment of the above embodiment, the fourth component is equal to a base-10 logarithm of a linear value of the fourth component multiplied by 10.

In one subembodiment of the above embodiment, a linear coefficient of the first power value and the fourth component is 1.

In one subembodiment of the above embodiment, the fourth component is $P_{0\_PUSCH,b,f,c}(j)$, and the specific meaning of the $P_{0\_PUSCH,b,f,c}(j)$ can be found in 3GPP TS38.213, section 7.1.1.

In one subembodiment of the above embodiment, the fourth component is a sum of a first sub-component and a second sub-component, and the second information is used to indicate a linear coefficient of the first power value and the second component as well as the second sub-component.

In one subembodiment of the above embodiment, the fourth component is $P_{0\_PUSCH,b,f,c}(j)$, the $P_{0\_PUSCH,b,f,c}(j)$ is a sum of $P_{0\_NOMINAL\_PUSCH,f,c}(j)$ and $P_{0\_UE-PUSCH,b,f,c}(j)$ the second information is used to indicate a linear coefficient of the first power value and the second component as well as the $P_{0\_UE\_PUSCH,b,f,c}(j)$; and the specific meanings of the $P_{0\_PUSCH,b,f,c}(j)$, $P_{0\_NOMINAL\_PUSCH,f,c}(j)$ and the $P_{0\_UE\_PUSCH,b,f,c}(j)$ can be found in 3GPP TS38.213, section 7.1.1.

In one embodiment, the first power value is linearly correlated to a fifth component (delta).

In one subembodiment of the above embodiment, the fifth component is measured by dB.

In one subembodiment of the above embodiment, the fifth component is equal to a base-10 logarithm of a linear value of the fifth component multiplied by 10.

In one subembodiment of the above embodiment, the fifth component is related to an MCS of the first radio signal.

In one subembodiment of the above embodiment, the fifth component is related to a number of Code Blocks of the first radio signal, a size of each CB and the M.

In one subembodiment of the above embodiment, the fifth component is $\Delta_{TF,b,f,c}(i)$, and the specific meaning of the $\Delta_{TF,b,f,c}(i)$ can be found in 3GPP TS38.213, section 7.1.1.

In one embodiment, the R is equal to 1.

In one embodiment, the R is greater than 1.

In one embodiment, the R piece(s) of third information explicitly indicates(indicate) R first offset(s).

In one embodiment, the R piece(s) of third information implicitly indicates(indicate) R first offset(s).

In one embodiment, the R piece(s) of third information indicates(respectively indicate) index(es) respectively corresponding to the R first offset(s).

In one embodiment, the R piece(s) of third information is(are respectively) dynamically configured.

In one embodiment, the R piece(s) of third information is(are respectively) carried by R physical-layer signaling(s).

In one embodiment, the R piece(s) of third information is(are respectively) carried by R DCI signaling(s).

In one embodiment, the R piece(s) of third information is(are respectively) carried by R TPC signaling(s).

In one embodiment, the R piece(s) of third information is(are respectively) carried by R uplink grant DCI signaling(s).

In one embodiment, the R is greater than 1, one of the R pieces of third information is carried by an uplink grant DCI signaling, and R-1 piece(s) of third information of the R pieces of third information is(are) carried by a Transmitter Power Control signaling.

In one embodiment, the R is greater than 1, there exists one of the R pieces of third information being carried by an uplink grant DCI signaling, and there exists one of the R pieces of third information being carried by a TPC signaling.

In one embodiment, the R is greater than 1, at least one of the R pieces of third information is carried by an uplink grant DCI signaling, and at least one of the R pieces of third information is carried by a TPC signaling.

In one embodiment, the R piece(s) of third information is(are respectively) carried by R DCI format 2_2 signaling(s), and the specific meaning of the DCI format 2_2 can be found in 3GPP TS38.212, section 7.3.

In one embodiment, the R piece(s) of third information is(are respectively) carried by R DCI format 0_0 or DCI format 0_1 signaling(s), and the specific meanings of the DCI format 0_0 and the DCI format 0_1 can be found in 3GPP TS38.212, section 7.3.

In one embodiment, the R is greater than 1, one of the R piece(s) of third information is carried by a DCI format 0_0 or DCI format 0_1 signaling, R-1 piece(s) of third information in the R pieces of third information is(are) carried by a DCI format 2_2 signaling, and the specific meanings of the DCI format 0_0, the DCI format 0_1 and the DCI format 2_2 can be found in 3GPP TS38. 212, section 7.3.

In one embodiment, the R is greater than 1, there exists one of the R pieces of third information being carried by a DCI format 0_0 or DCI format 0_1 signaling, there exists one of the R pieces of third information being carried by DCI format 2_2 signaling, and the specific meanings of the DCI format 0_0, the DCI format 0_1 and the DCI format 2_2 can be found in 3GPP TS38.212, section 7.3.

In one embodiment, the R is greater than 1, at least one of the R pieces of third information is carried by a DCI format 0_0 or DCI format 0_1 signaling, at least one of the R pieces of third information is carried by a DCI format 2_2 signaling, and the specific meanings of the DCI format 0_0, the DCI format 0_1 and the DCI format 2_2 can be found in 3GPP TS38. 212, section 7.3.

In one embodiment, the R is greater than 1, and one of the R pieces of third information and the first information are carried by a same DCI signaling.

In one embodiment, the R is greater than 1, and an end time for transmitting a DCI signaling corresponding to any of the R pieces of third information respectively carried by a different DCI signaling with the first information is not later than an end time for transmitting a DCI signaling carrying the first information.

In one embodiment, the R is greater than 1, and an end time for transmitting a DCI signaling corresponding to any of the R pieces of third information respectively carried by a different DCI signaling with the first information is earlier than an end time for transmitting a DCI signaling carrying the first information.

In one embodiment, the R is greater than 1, a latest multicarrier symbol occupied by a DCI signaling corresponding to any of the R pieces of third information respectively carried by a different DCI signaling with the first information is not later than a latest multicarrier symbol occupied by a DCI signaling carrying the first information.

In one embodiment, the R is greater than 1, a latest multicarrier symbol occupied by a DCI signaling corresponding to any of the R pieces of third information respectively carried by a different DCI signaling with the first information is earlier than a latest multicarrier symbol occupied by a DCI signaling carrying the first information.

In one embodiment, the R is greater than 1, one of the R pieces of third information and the first information are carried by a same DCI signaling, the one of the R pieces of third information comprises a TPC command for scheduled PUSCH field.

In one embodiment, the R is equal to 1, and the R piece of third information and the first information are carried by a same DCI signaling.

In one embodiment, the R is equal to 1, the R piece of third information and the first information are carried by a same DCI signaling, and the R piece of third information comprises a TPC command for scheduled PUSCH field.

In one embodiment, the R piece(s) of third information is(are) transmitted on a downlink physical layer control channel (i.e., a downlink channel only capable of carrying a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, the R piece(s) of third information is(are) transmitted on a downlink physical layer data channel.

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the third component is measured by dB.

In one embodiment, the third component is a PUSCH power control adjustment state.

In one embodiment, each of the R first offset(s) is(are) measured by dB.

In one embodiment, the R is equal to 1, and the third component and the R first offset are the same.

In one embodiment, the R is greater than 1, and the third component is a sum of the R first offsets.

In one embodiment, the third component is equal to a base-10 logarithm of a linear value of the third component multiplied by 10.

In one embodiment, a linear coefficient of the third component and each of the R first offsets is a positive real number.

In one embodiment, a linear coefficient of the third component and each of the R first offsets is 1.

In one embodiment, a linear coefficient of the first power value and the third component is a positive real number.

In one embodiment, a linear coefficient of the first power value and the third component is 1.

In one embodiment, the third component is $f_{b,f,c}(i,l)$, and the $f_{b,f,c}(i,l)$ is a PUSCH power control adjustment state, and the specific meaning of the $f_{b,f,c}(i,l)$ can be found in 3GPP TS38.213, section 7.1.1.

In one embodiment, the above method also comprises:

monitoring whether there is a radio signal being transmitted in a first time window in the N frequency subbands.

In one subembodiment of the above embodiment, the base station monitors whether a radio signal is transmitted in a first time window in each of the N frequency subbands.

In one subembodiment of the above embodiment, the first time window comprises time-domain resources occupied by the first radio signal.

In one subembodiment of the above embodiment, whether a radio signal is transmitted is monitored respectively in each of the N frequency subbands.

In one subembodiment of the above embodiment, it is judged that the UE transmits a radio signal in only the $N_1$ frequency subband(s) in the N frequency subbands according to the monitoring performed in the first time window in the N frequency subbands.

In one subembodiment of the above embodiment, it is judged that the UE transmits a radio signal in only the $M_1$ frequency subband(s) in the M frequency subbands according to the monitoring performed in the first time window in the N frequency subbands.

In one subembodiment of the above embodiment, it is judged that the UE does not transmit a radio signal or a radio signal transmitted by the UE is not received successfully in $M-M_1$ frequency-domain resource block(s) other than the $M_1$ frequency-domain resource block(s) in the M frequency-domain resource blocks according to the monitoring performed in the first time window in the N frequency subbands.

In one subembodiment of the above embodiment, it is judged that the UE does not transmit a radio signal in $M-M_1$ frequency-domain resource block(s) other than the $M_1$ frequency-domain resource block(s) in the M frequency-domain resource blocks according to the monitoring performed in the first time window in the N frequency subbands.

In one subembodiment of the above embodiment, it is judged that a radio signal transmitted by the UE is not received successfully in $M-M_1$ frequency-domain resource block(s) other than the $M_1$ frequency-domain resource block(s) in the M frequency-domain resource blocks according to the monitoring performed in the first time window in the N frequency subbands.

In one embodiment, the monitoring refers to a blind detection, that is, receiving a signal and performing a decoding operation, if the decoding is determined as correct according to a Cyclic Redundancy Check (CRC) bit, it is judged that a given radio signal is transmitted in a given time window in a given frequency subband; otherwise, it is judged that the given radio signal is not transmitted in a given time window in a given frequency subband.

In one embodiment, the monitoring refers to a coherent detection, that is, performing a coherent reception with an RS sequence of a DMRS of a physical layer channel where a given radio signal is located, and measuring energy of a signal obtained after the coherent reception; if the energy of the signal obtained after the coherent reception is greater than a first given threshold, it is judged that the given radio signal is transmitted in a given time window in a given frequency subband; otherwise, it is judged that the given radio signal is not transmitted in a given time window in a given frequency subband.

In one embodiment, the monitoring refers to an energy detection, that is, sensing energy of a radio signal averaging it in time to obtain received energy. If the received energy is greater than a second given threshold, it is judged that a given radio signal is transmitted in a given time window in a given frequency subband; otherwise, it is judged that the given radio signal is not transmitted in a given time window in a given frequency subband.

In one embodiment, the monitoring refers to a coherent detection, that is, performing a coherent reception with a sequence of a given radio signal, and measuring energy of a signal obtained after the coherent reception. If the energy of the signal obtained after the coherent reception is greater than a third given threshold, it is judged that the given radio signal is transmitted in a given time window in a given frequency subband; otherwise, it is judged that the given radio signal is not transmitted in a given time window in a given frequency subband.

In one embodiment, a given node judges whether a given radio signal is transmitted in a given time window in a given frequency subband according to energy of a received signal.

In one subembodiment of the above embodiment, the given node is the base station.

In one subembodiment of the above embodiment, if energy of a received signal is low, the given node assumes that the given radio signal is not transmitted in a given time window in a given frequency subband, otherwise, the given node assumes that the given radio signal is transmitted in a given time window in a given frequency subband.

In one subembodiment of the above embodiment, if the energy of a received signal is lower than a reference energy threshold, the given node assumes that the given radio signal is not transmitted in a given time window in a given frequency subband, otherwise, the given node assumes that the given radio signal is transmitted in a given time window in a given frequency subband; and the reference energy threshold is configured by the given node itself In one embodiment, a given node judges whether a given radio signal is transmitted in a given time window in a given frequency subband according to power of a received signal.

In one subembodiment of the above embodiment, the given node is the base station.

In one subembodiment of the above embodiment, if power of a receive signal is low, the given node assumes that the given radio signal is not transmitted in a given time window in a given frequency subband, otherwise, the given node assumes that the given radio signal is transmitted in a given time window in a given frequency subband.

In one subembodiment of the above embodiment, if power of a received signal is lower than a reference power threshold, the given node assumes that the given radio signal is not transmitted in a given time window in a given frequency subband, otherwise, the given node assumes that the given radio signal is transmitted in a given time window in a given frequency subband; and the reference power threshold is configured by the given node itself.

In one embodiment, a given node judges whether the given radio signal is transmitted in a given time window in a given frequency subband according to a correlation of a receive signal and a given radio signal.

In one subembodiment of the above embodiment, the given node is the base station.

In one subembodiment of the above embodiment, if a correlation of a received signal and the given radio signal is low, the given node assumes that the given radio signal is not transmitted in a given time window in a given frequency subband, otherwise, the given node assumes that the given radio signal is transmitted in a given time window in a given frequency subband.

In one subembodiment of the above embodiment, if a correlation of a received signal and the given radio signal is lower than a reference correlation threshold, the given node assumes that the given radio signal is not transmitted in a given time window in a given frequency subband, otherwise, the given node assumes that the given radio signal is transmitted in a given time window in a given frequency subband; and the reference correlation threshold is configured by the given node itself.

In one embodiment, a given node measures a received signal according to a configuration parameter of a given radio signal so as to estimate a channel, and the given node judges whether the given radio signal is transmitted in a given time window in a given frequency subband according to the estimated channel.

In one subembodiment of the above embodiment, the given node is the base station.

In one subembodiment of the above embodiment, if energy of the estimated channel is low, the given node assumes that the given radio signal is not transmitted in a given time window in a given frequency subband, otherwise, the given node assumes that the given radio signal is transmitted in a given time window in a given frequency subband.

In one subembodiment of the above embodiment, if energy of the estimated channel is lower than a reference channel energy threshold, the given node assumes that the given radio signal is not transmitted in a given time window in a given frequency subband, otherwise, the given node assumes that the given radio signal is transmitted in a given time window in a given frequency subband; the reference channel energy threshold is configured by the given node itself.

In one subembodiment of the above embodiment, if power of the estimated channel is low, the given node assumes that the given radio signal is not transmitted in a given time window in a given frequency subband, otherwise, the given node assumes that the given radio signal is transmitted in a given time window in a given frequency subband.

In one subembodiment of the above embodiment, if power of the estimated channel is lower than a reference channel power threshold, the given node assumes that the given radio signal is not transmitted in a given time window in a given frequency subband, otherwise, the given node assumes that the given radio signal is transmitted in a given time window in a given frequency subband; the reference channel power threshold is configured by the given node itself.

In one subembodiment of the above embodiment, if characteristics of the estimated channel do not conform to characteristics assumed by the given node, the given node assumes that the given radio signal is not transmitted in a given time window in a given frequency subband, otherwise, the given node assumes that the given radio signal is transmitted in a given time window in a given frequency subband.

Embodiment 6

Figure 6:
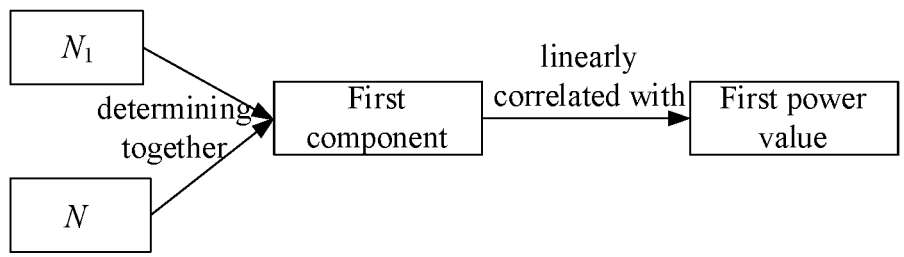
FIG. 6 illustrates a schematic diagram of a first power value related to $N_1$ according to one embodiment of the present disclosure.

Embodiment 6 illustrates a schematic diagram of a first power value related to $N_1$, as shown in FIG. 6.

In Embodiment 6, the first power value is linearly correlated with a first component; and the $N_1$ and the N in the present disclosure are used to determine the first component.

In one embodiment, the $N_1$ and the N are used to determine the first component, and numbers of frequency-domain resource block(s) in the M frequency-domain resource blocks comprised in any two of the N frequency subbands are the same.

In one embodiment, the $N_1$ and the N are used to determine the first component, any of the N frequency subbands comprises M/N frequency-domain resource blocks in the M frequency-domain resource blocks, and the M is positive integer multiple of the N.

In one embodiment, a linear value of the first component is equal to a value of the N divided by the $N_1$.

In one subembodiment of the above embodiment, a linear coefficient of the first power value and the first component is a negative real number.

In one subembodiment of the above embodiment, a linear coefficient of the first power value and the first component is −1.

In one embodiment, a linear value of the first component is equal to a value of the $N_1$ divided by the N.

In one subembodiment of the above embodiment, a linear coefficient of the first power value and the first component is a positive real number.

In one subembodiment of the above embodiment, a linear coefficient of the first power value and the first component is 1.

Embodiment 7

Figure 7:
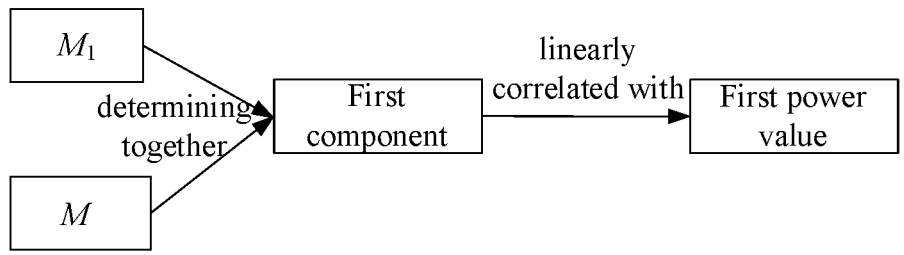
FIG. 7 illustrates a schematic diagram of a first power value related to $M_1$ according to one embodiment of the present disclosure.

Embodiment 7 illustrates a schematic diagram of a first power value related to $M_1$, as shown in FIG. 7.

In Embodiment 7, the first power value is linearly correlated with a first component; and the $M_1$ and the M in the present disclosure are used to determine the first component.

In one embodiment, a linear value of the first component is equal to a value of the M divided by the $M_1$.

In one subembodiment of the above embodiment, a linear coefficient of the first power value and the first component is a negative real number.

In one subembodiment of the above embodiment, a linear coefficient of the first power value and the first component is −1.

In one embodiment, a linear value of the first component is equal to a value of the $M_1$ divided by the M.

In one subembodiment of the above embodiment, a linear coefficient of the first power value and the first component is a positive real number.

In one subembodiment of the above embodiment, a linear coefficient between the first power value and the first component is 1.

Embodiment 8

Figure 8:
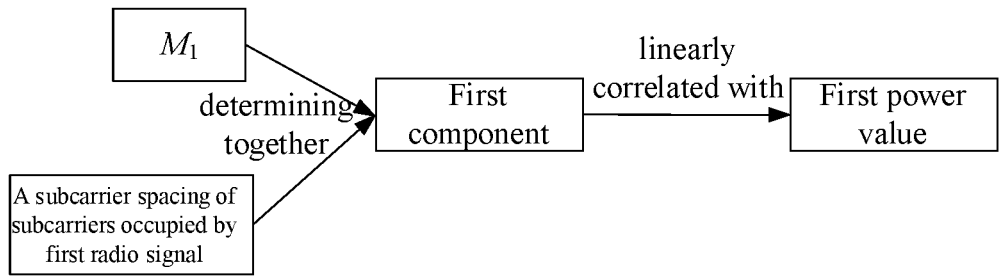
FIG. 8 illustrates a schematic diagram of a first power value related to $M_1$ according to another embodiment of the present disclosure.

Embodiment 8 illustrates another schematic diagram of a first power value related to $M_1$, as shown in FIG. 8.

In Embodiment 8, the first power value is linearly correlated with a first component; the $M_1$ and an SCS of subcarriers occupied by the first radio signal in the present disclosure are used to determine the first component.

In one embodiment, a linear value of the first component is equal to a product of the $M_1$ and $2^\mu$, that is, $2^\mu M_1$, where the $2^\mu$ is equal to a value obtained by an SCS of subcarriers occupied by the first radio signal divided by 15 kHz.

In one subembodiment of the above embodiment, a linear coefficient of the first power value and the first component is a positive real number.

In one subembodiment of the above embodiment, a linear coefficient of the first power value and the first component is 1.

In one subembodiment of the above embodiment, an SCS of subcarriers occupied by the first radio signal is equal to 15 kHz, the $\mu$ is equal to 0, and the $2^\mu$ is equal to 1.

In one subembodiment of the above embodiment, an SCS of subcarriers occupied by the first radio signal is equal to 30 kHz, the $\mu$ is equal to 1, and the $2^\mu$ is equal to 2.

In one subembodiment of the above embodiment, an SCS of subcarriers occupied by the first radio signal is equal to 60 kHz, the $\mu$ is equal to 2, and the $2^\mu$ is equal to 4.

In one subembodiment of the above embodiment, an SCS of subcarriers occupied by the first radio signal is equal to 120 kHz, the $\mu$ is equal to 3, and the $2^\mu$ is equal to 8.

In one subembodiment of the above embodiment, an SCS of subcarriers occupied by the first radio signal is equal to 240 kHz, the $\mu$ is equal to 4, and the $2^\mu$ is equal to 16.

Embodiment 9

Figure 9:
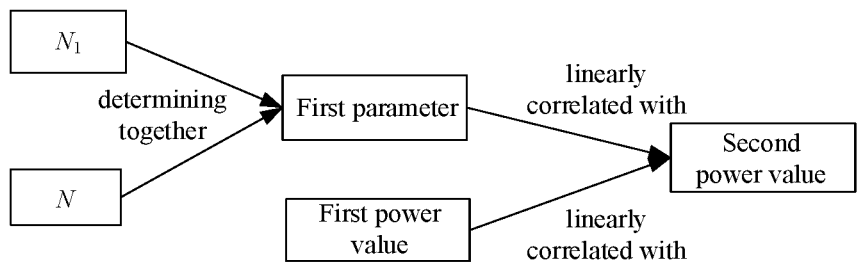
FIG. 9 illustrates a schematic diagram of a first power value and $N_1$ used together to determine a second power value according to one embodiment of the present disclosure.

Embodiment 9 illustrates a schematic diagram of a first power and $N_1$ used together to determine a second power value, as shown in FIG. 9.

In Embodiment 9, the second power value is linearly correlated with both the first power value and a first parameter; and the $N_1$ and the N in the present disclosure are used to determine the first parameter.

In one embodiment, the $N_1$ and the N are used to determine the first parameter, and numbers of frequency-domain resource block(s) in the M frequency-domain resource blocks comprised in any two of the N frequency subbands are the same.

In one embodiment, the $N_1$ and the N are used to determine the first parameter, any of the N frequency subbands comprises M/N frequency-domain resource blocks in the M frequency-domain resource blocks, and the M is positive integer multiple of the N.

In one embodiment, the first power value is related to the $N_1$, and the first power value and the $N_1$ are used together to determine the second power value.

In one embodiment, a linear value of the first parameter is equal to a value of the N divided by the $N_1$.

In one subembodiment of the above embodiment, a linear coefficient of the second power value and the first parameter is a positive real number.

In one subembodiment of the above embodiment, a linear coefficient of the second power value and the first parameter is 1.

In one embodiment, a linear value of the first parameter is equal to a value of the $N_1$ divided by the N.

In one subembodiment of the above embodiment, a linear coefficient of the second power value and the first parameter is a negative real number.

In one subembodiment of the above embodiment, a linear coefficient of the second power value and the first parameter is −1.

Embodiment 10

Figure 10:
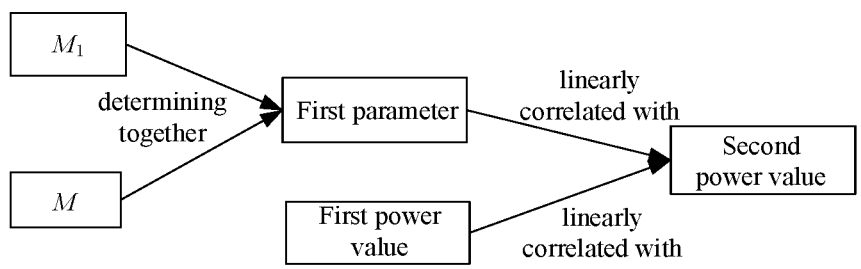
FIG. 10 illustrates a schematic diagram of a first power value and $M_1$ used together to determine a second power value according to one embodiment of the present disclosure.

Embodiment 10 illustrates a schematic diagram of a first power and $M_1$ used together to determine a second power value, as shown in FIG. 10.

In Embodiment 10, the second power value is linearly correlated with both the first power value and a first parameter; the $M_1$ and the M in the present disclosure are used to determine the first parameter.

In one embodiment, the first power value is related to the $M_1$, and the first power value and the $M_1$ are used together to determine the second power value.

In one embodiment, a linear value of the first parameter is equal to a value of the M divided by the $M_1$.

In one subembodiment of the above embodiment, a linear coefficient of the second power value and the first parameter is a positive real number.

In one subembodiment of the above embodiment, a linear coefficient of the second power value and the first parameter is 1.

In one embodiment, a linear value of the first parameter is equal to a value of the $M_1$ divided by the M.

In one subembodiment of the above embodiment, a linear coefficient of the second power value and the first parameter is a negative real number.

In one subembodiment of the above embodiment, a linear coefficient of the second power value and the first parameter is −1.

Embodiment 11

Figure 11:
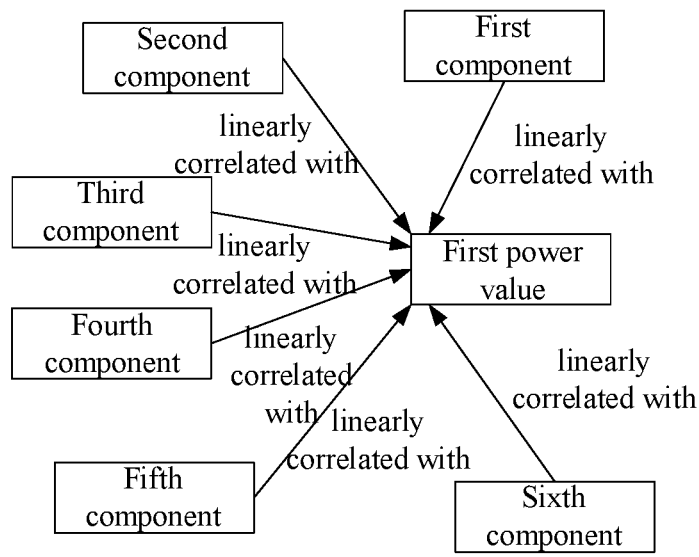
FIG. 11 illustrates a schematic diagram of a first power value according to one embodiment of the present disclosure.

Embodiment 11 illustrates a schematic diagram of a first power value, as shown in FIG. 11.

In Embodiment 11, the first power value is linearly correlated with the first component, the second component, the third component, the fourth component, the fifth component and the sixth component in the present disclosure.

In one embodiment, the $N_1$ and the N in the present disclosure are used to determine the first component.

In one embodiment, the $M_1$ and the M in the present disclosure are used to determine the first component.

In one embodiment, the first power value is linearly correlated with the first component, the second component, the third component, the fourth component, the fifth component and the sixth component; a linear coefficient of the first power value and the third component is 1, a linear coefficient of the first power value and the fourth component is 1, a linear coefficient of the first power value and the fifth component is 1, a linear coefficient of the first power value and the sixth component is 1, that is:

$$P_1 = p_4 + p_6 + b_1 p_1 + b_2 p_2 + p_5 + p_3$$

wherein, $P_1$, $p_1$, $b_1$, $p_2$, $b_2$, $p_3$, $p_4$ and $p_5$ are respectively the first power value, the first component, a linear coefficient of the first power value and the first component, the second component, a linear coefficient of the first power value and the second component, the third component, the fourth component and the fifth component.

In one embodiment, the first power value is linearly correlated with the first component, the second component, the third component, the fourth component, the fifth component and the sixth component; a linear coefficient of the first power value and the third component is 1, a linear coefficient of the first power value and the fourth component is 1, a linear coefficient of the first power value and the fifth component is 1, and a linear coefficient of the first power value and the sixth component is 1, that is:

$$P_1 = P_{O_{PUSCH},b,f,c}(j) + 10 \log_{10}(2^\mu M_{RB,b,f,c}^{PUSCH}(i)) + b_1 p_1 + \alpha_{b,f,c}(j) PL_{b,f,c}(q_d) + \Delta_{TF,b,f,c}(i) + f_{b,f,c}(i,l);$$

wherein $P_1$, $p_1$ and $b_1$ are respectively the first power value, the first component, and a linear coefficient of the first power value and the first component; the specific meanings of the $P_{O_{PUSCH},b,f,c}(j)$, the $10 \log_{10}(2^\mu M_{RB,b,f,c}^{PUSCH}(i))$, the $\alpha_{b,f,c}(j)$ the $PL_{b,f,c}(q_d)$, the $\Delta_{TF,b,f,c}(i)$ and the $f_{b,f,c}(i,l)$ can be found in TS38.213, section 7.1.1.

In one embodiment, the sixth component is measured by dB.

In one embodiment, the sixth component is equal to a base-10 logarithm of a linear value of the sixth component multiplied by 10.

In one embodiment, the sixth component is $10 \log_{10}(2^\mu M_{RB,b,f,c}^{PUSCH}(i))$, and the specific meaning of the $10 \log_{10}(2^\mu M_{RB,b,f,c}^{PUSCH}(i))$ can be found in TS38.213, section 7.1.1.

In one embodiment, a linear value of the sixth component is equal to a product of the M and $2^\mu$, that is, $2^\mu M$, where the $2^\mu$ is equal to a value obtained by an SCS of subcarriers occupied by the first radio signal divided by 15 kHz.

In one subembodiment of the above embodiment, a linear coefficient of the first power value and the sixth component is a positive real number.

In one subembodiment of the above embodiment, a linear coefficient of the first power value and the sixth component is 1.

In one subembodiment of the above embodiment, an SCS of subcarriers occupied by the first radio signal is equal to 15 kHz, the μ is equal to 0, and the $2^\mu$ is equal to 1.

In one subembodiment of the above embodiment, an SCS of subcarriers occupied by the first radio signal is equal to 30 kHz, the μ is equal to 1, and the $2^\mu$ is equal to 2.

In one subembodiment of the above embodiment, an SCS of subcarriers occupied by the first radio signal is equal to 60 kHz, the μ is equal to 2, and the $2^\mu$ is equal to 4.

In one subembodiment of the above embodiment, an SCS of subcarriers occupied by the first radio signal is equal to 120 kHz, the μ is equal to 3, and the $2^\mu$ is equal to 8.

In one subembodiment of the above embodiment, an SCS of subcarriers occupied by the first radio signal is equal to 240 kHz, the μ is equal to 4, and the $2^\mu$ is equal to 16.

Embodiment 12

Figure 12:
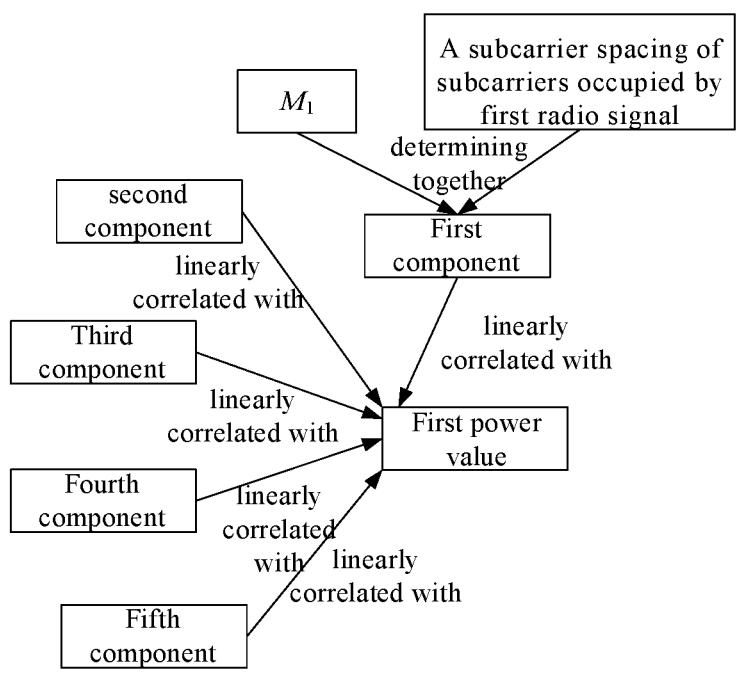
FIG. 12 illustrates a schematic diagram of a first power value according to another embodiment of the present disclosure.

Embodiment 12 illustrates another schematic diagram of a first power value, as shown in FIG. 12.

In Embodiment 12, the first power value is linearly correlated with the first component, the second component, the third component, the fourth component and the fifth component in the present disclosure, and the $M_1$ in the present disclosure and an SCS of subcarriers occupied by the first radio signal are used to determine the first component.

In one embodiment, the first power value is linearly correlated with the first component, the second component, the third component, the fourth component and the fifth component; a linear coefficient of the first power value and the third component is 1, a linear coefficient of the first power value and the fourth component is 1, a linear coefficient of the first power value and the fifth component is 1, that is:

$$P_1 = p_4 + b_1 p_1 + b_2 p_2 + p_5 + p_3;$$

wherein, $P_1$, $p_1$, $b_1$, $p_2$, $b_2$, $p_3$, $p_4$ and $p_5$ are respectively the first power value, the first component, a linear coefficient of the first power value and the first component, the second component, a linear coefficient of the first power value and the second component, the third component, the fourth component and the fifth component.

In one embodiment, the first power value is linearly correlated with the first component, the second component, the third component, the fourth component and the fifth component; a linear coefficient of the first power value and the third component is 1, a linear coefficient of the first power value and the fourth component is 1, and a linear coefficient of the first power value and the fifth component is 1, that is:

$$P_1 = P_{O_{PUSCH},b,f,c}(j) + b_1 p_1 + \alpha_{b,f,c}(j) PL_{b,f,c}(q_d) + \Delta_{TF,b,f,c}(i) + f_{b,f,c}(i,l);$$

Wherein $P_1$, $p_1$ and $b_1$ are respectively the first power value, the first component, and a linear coefficient of the first power value and the first component; the specific meanings of the $P_{O_{PUSCH},b,f,c}(j)$, the $\alpha_{b,f,c}(j)$, the $PL_{b,f,c}(q_d)$, the $\Delta_{TF,b,f,c}(i)$ and the $f_{b,f,c}(i,l)$ can be found in TS38.213, section 7.1.1.

Embodiment 13

Figure 13:
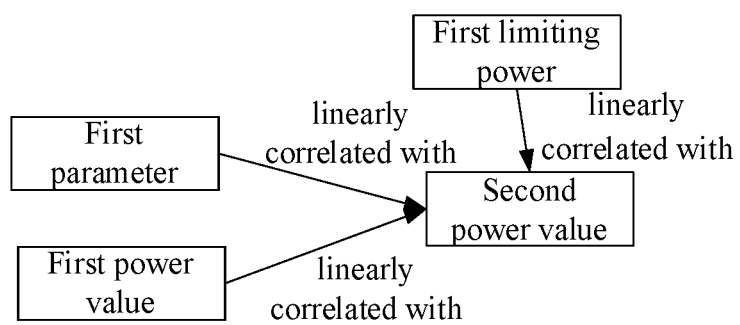
FIG. 13 illustrates a schematic diagram of a second power value according to one embodiment of the present disclosure.

Embodiment 13 illustrates a schematic diagram of a second power value, as shown in FIG. 13.

In Embodiment 13, the second power value is linearly correlated with the first limiting power value, the first power value and the first parameter in the present disclosure.

In one embodiment, the second power value is linearly correlated with the first limiting power value, the first power value and the first parameter, a linear coefficient of the second power value and the first limited power value is 1, a linear coefficient of the second power value and the first power value is −1, and a linear coefficient of the second power value and the first parameter is α, that is:

$$P_2 = P_{max} - P_1 + ar;$$

herein, $P_2$, $P_{max}$, $P_1$ and r are respectively the second power value, the first limiting power value, the first power value and the first parameter.

In one subembodiment of the above embodiment, a linear value of the first parameter is equal to the N divided by the $N_1$, and a linear coefficient of the second power value and the first parameter is a positive real number, that is α>0.

In one subembodiment of the above embodiment, a linear value of the first parameter is equal to the N divided by the $N_1$, and a linear coefficient of the second power value and the first parameter is 1, that is α=1.

In one subembodiment of the above embodiment, a linear value of the first parameter is equal to the $N_1$ divided by the N, and a linear coefficient of the second power value and the first parameter is a negative real number, that is α<0.

In one subembodiment of the above embodiment, a linear value of the first parameter is equal to the $N_1$ divided by the N, and a linear coefficient of the second power value and the first parameter is −1, that is α=−1.

In one subembodiment of the above embodiment, a linear value of the first parameter is equal to the M divided by the $M_1$, and a linear coefficient of the second power value and the first parameter is a positive real number, that is α>0.

In one subembodiment of the above embodiment, a linear value of the first parameter is equal to the M divided by the $M_1$, and a linear coefficient of the second power value and the first parameter is 1, that is α=1.

In one subembodiment of the above embodiment, a linear value of the first parameter is equal to the $M_1$ divided by the M, and a linear coefficient of the second power value and the first parameter is a negative real number, that is α<0.

In one subembodiment of the above embodiment, a linear value of the first parameter is equal to the $M_1$ divided by the M, and a linear coefficient of the second power value and the first parameter is −1, that is α=−1.

Embodiment 14

Figure 14:
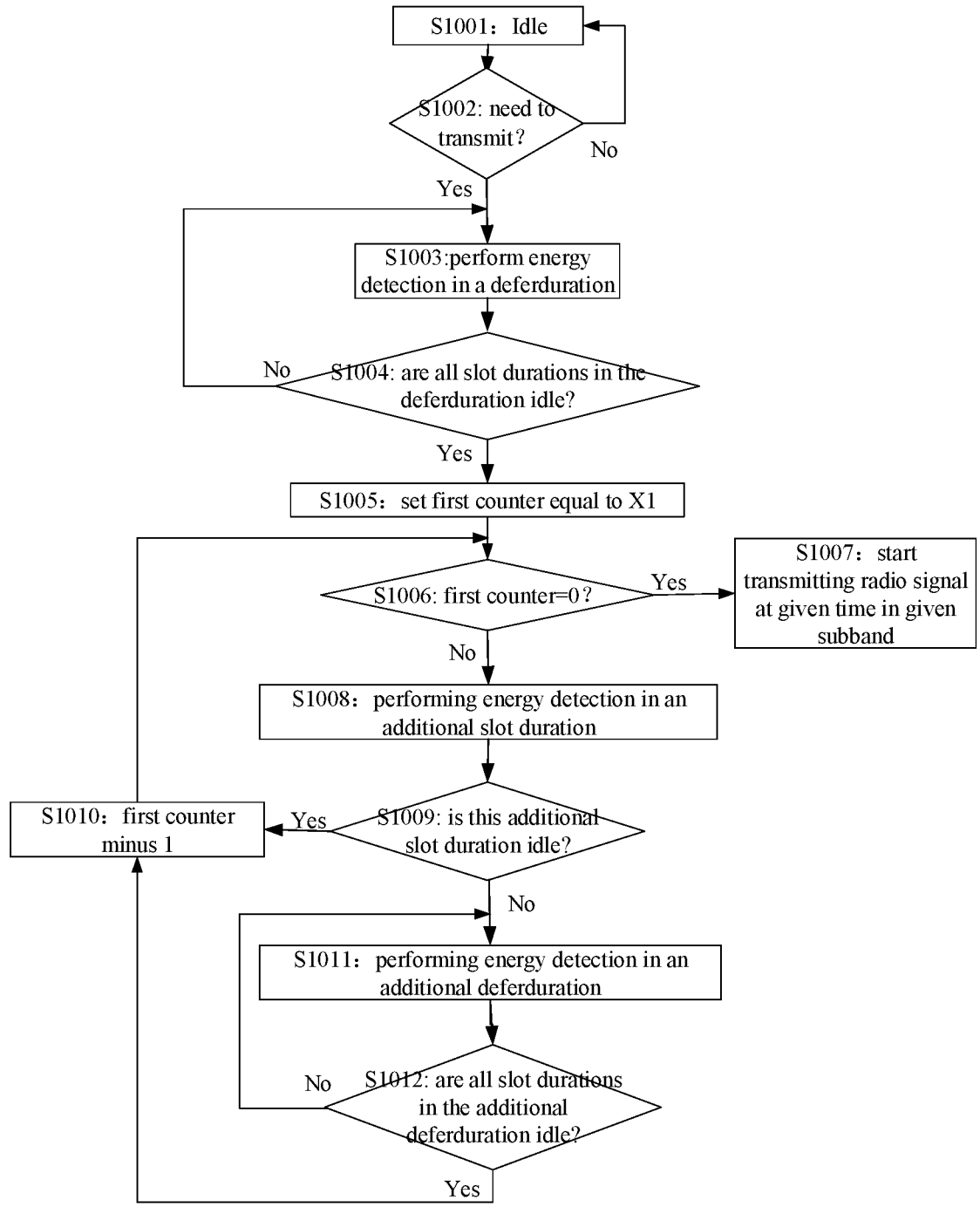
FIG. 14 illustrates a schematic diagram of a given access detection performed in a given frequency subband being used to determine whether a radio signal is transmitted at a given time in the given frequency subband according to one embodiment of the present disclosure.

Embodiment 14 illustrates a schematic diagram of a given access detection performed in a given frequency subband being used to determine whether a radio signal is transmitted at a given time in the given frequency subband, as shown in FIG. 14.

In Embodiment 14, the given access detection includes respectively performing X energy detection(s) in X time subpool(s) in the given frequency subband to obtain X detection value(s), X being a positive integer; an end time of the X time subpool(s) is not later the given time; the given access detection corresponds to one of the N access detections comprised in the channel access detection in the present disclosure, and the given frequency subband corresponds to one of the N frequency subbands in the present disclosure used to perform the given access detection. The process of the given access detection can be described by the flowchart in FIG. 14.

In FIG. 14, the base station in the present disclosure is idle in step S1001, judges whether a transmission is required in step S1002; performs an energy detection within a defer duration in step S1003; judges whether all slot durations in the defer duration are idle in step S1004, if so, sets a first counter to be equal to X1 in step S1005, the X1 being an integer not greater than the X; otherwise, returns back to step S1004; judges whether the first counter is 0 in step S1006, if so, transmits the radio signal at the given time in the given frequency subband in step S1007; otherwise, performs an energy detection within an additional slot duration in step S1008; judges whether the additional slot duration is idle in step S1009, if so, subtracts the first counter by 1 in step S1010, and then returns back to step 1006; otherwise, performs an energy detection within an additional defer duration in step S1011; judges whether all slot durations in the additional defer duration are idle in step S1012, and if so, goes to step S1010; otherwise, returns back to step S1011.

In Embodiment 14, the first counter in FIG. 14 is reset before the given time, the result of the given access detection is that the channel is idle, and a radio signal can be transmitted at the given time; otherwise, a radio signal cannot be transmitted at the given time; a condition for clearing the first timer is that each of X1 detection value(s) out of the X detection value(s) corresponding to X1 time subpool(s) out of the X time subpool(s) is less than a first reference threshold, and a start time of the X1 time subpool(s) is after the step S1005 in FIG. 14.

In one embodiment, an end time of the given access detection is not later than the given time.

In one embodiment, an end time of the given access detection is earlier than the given time.

In one embodiment, the X time sub-pool(s) comprises (comprise) all of defer durations in FIG. 14.

In one embodiment, the X time sub-pool(s) comprises (comprise) part of defer durations in FIG. 14.

In one embodiment, the X time sub-pool(s) comprises (comprise) all of defer durations and all of additional slot durations in FIG. 14.

In one embodiment, the X time sub-pool(s) comprises (comprise) all of defer durations and part of additional slot durations in FIG. 14.

In one embodiment, the X time sub-pool(s) comprises (comprise) all of defer durations, all of additional slot durations and all of additional defer durations in FIG. 14.

In one embodiment, the X time sub-pool(s) comprises (comprise) all of defer durations, part of additional slot durations and all of additional defer durations in FIG. 14.

In one embodiment, the X time sub-pool(s) comprises (comprise) all of defer durations, part of additional slot durations and part of additional defer durations in FIG. 14.

In one embodiment, a duration of any of the X time sub-pool(s) is one of 16 microseconds or 9 microseconds.

In one embodiment, any slot duration within a given time duration is one of the X time sub-pool(s); the given time duration is any of all of defer durations, all of additional slot durations, or all of additional defer durations comprised in FIG. 14.

In one embodiment, performing an energy detection within a given time duration refers to: performing an energy detection in all of slot durations in the given time duration; the given time duration is any of all of defer durations, all of additional slot durations, or all of additional defer durations comprised in FIG. 14.

In one embodiment, being judged as idle within a given time duration through an energy detection refers to: each of slot durations comprised within the given duration is determined as idle through an energy detection; the given time duration is any of all of defer durations, all of additional slot durations, or all of additional defer durations comprised in FIG. 14.

In one embodiment, being determined as idle within a given slot duration through an energy detection refers to: the base station senses power of all radio signals in the given frequency subband in a given time unit and averages it in time, and the obtained received power is lower than the first reference threshold; the given time unit is a duration within the given slot duration.

In one subembodiment of the above embodiment, a duration of the given time unit is not less than 4 microseconds.

In one embodiment, being determined as idle within a given slot duration through an energy detection refers to: the base station senses energy of all radio signals in the given frequency subband in a given time unit and averages it in time, and the obtained received energy is lower than the first reference threshold; the given time unit is a duration within the given slot duration.

In one subembodiment of the above embodiment, a duration of the given time unit is not less than 4 microseconds.

In one embodiment, performing an energy detection within a given time duration refers to: performing an energy detection in each of time sub-pool(s) within the given time duration; the given time duration is any of all of defer durations, all of additional slot durations, or all of additional defer durations comprised in FIG. 14, and the each of time sub-pool(s) belongs to the X time sub-pool(s).

In one embodiment, being determined as idle within a given time duration through an energy detection refers to: a detection value obtained through an energy detection on each of time sub-pool(s) comprised within the given duration is lower than the first reference threshold; the given time duration is any of all of defer durations, all of additional slot durations, or all of additional defer durations comprised in FIG. 14; the each of time sub-pool(s) belongs to the X time sub-pool(s), and the detection value belongs to the X detection value(s).

In one embodiment, a defer duration lasts 16 microseconds plus Y1 9 microsecond(s), the Y1 being a positive integer.

In one subembodiment of the above embodiment, a defer duration comprises Y1+1 time sub-pools in the X time sub-pool(s)

In one reference embodiment of the above subembodiment, a first time sub-pool in the Y1+1 time sub-pools lasts 16 microseconds, and each of the other Y1 time sub pool(s) lasts 9 microseconds.

In one subembodiment of the above embodiment, the given priority class is used to determine the Y1.

In one reference embodiment of the above subembodiment, the given priority class is a Channel Access Priority Class, and the specific meaning of the Channel Access Priority Class can be found in 3GPP TS36.213, section 15.

In one subembodiment of the above embodiment, the Y1 belongs to 1, 2, 3 and 7.

In one embodiment, a defer duration comprises a plurality of slot durations.

In one subembodiment of the above embodiment, a first slot duration and a second slot duration in the multiple slot durations are non-consecutive.

In one subembodiment of the above embodiment, a first slot duration and a second slot duration in the multiple slot durations are spaced by 7 ms.

In one embodiment, an additional defer duration lasts 16 microseconds plus Y2 9 microsecond(s), the Y2 being a positive integer.

In one subembodiment of the above embodiment, an additional defer duration comprises Y2+1 time sub-pools in the X time sub-pools.

In one reference embodiment of the above subembodiment, a first time sub-pool in the Y2+1 time sub-pools lasts 16 microseconds, and the each of the other Y2 time sub-pool(s) lasts 9 microseconds.

In one subembodiment of the above embodiment, the given priority class is used to determine the Y2.

In one subembodiment of the above embodiment, the Y2 belongs to 1, 2, 3 and 7.

In one embodiment, a defer duration lasts as long as an additional defer duration.

In one embodiment, the Y1 is equal to the Y2.

In one embodiment, an additional defer duration comprises a plurality of slot durations.

In one subembodiment of the above embodiment, a first slot duration and a second slot duration in the multiple slot durations are non-consecutive.

In one subembodiment of the above embodiment, a first slot duration and a second slot duration in the multiple slot durations are spaced by 7 ms.

In one embodiment, a slot duration lasts 9 ns.

In one embodiment, a slot duration is one of the X time sub-pool(s).

In one embodiment, an additional slot duration lasts 9 microseconds.

In one embodiment, an additional slot duration comprises one of the X time sub-pool(s).

In one embodiment, the X energy detection(s) is(are) used to determine whether the given frequency subband is idle.

In one embodiment, the X energy detection(s) is(are) used to determine whether the given frequency subband can be used by the base station for transmitting a radio signal.

In one embodiment, each of the X detection value(s) is measured by dBm.

In one embodiment, each of the X detection value(s) is measured by mW.

In one embodiment, each of the X detection value(s) is measured by Joule.

In one embodiment, the X1 is less than the X.

In one embodiment, the X is greater than 1.

In one embodiment, the first reference threshold is measured by dBm.

In one embodiment, the first reference threshold is measured by mW.

In one embodiment, the first reference threshold is measured by Joule.

In one embodiment, the first reference threshold is equal to or less than −72 dBm.

In one embodiment, the first reference threshold is equal to or less than any value of a first given value.

In one subembodiment of the above embodiment, the first given value is pre-defined.

In one subembodiment of the above embodiment, the first given value is configured by a higher-layer signaling.

In one embodiment, the first reference threshold is freely selected by the base station under the condition of equal to or less than a first given value.

In one subembodiment of the above embodiment, the first given value is pre-defined.

In one subembodiment of the above embodiment, the first given value is configured by a higher-layer signaling.

In one embodiment, the X energy detection(s) is(are) energy detection(s) in Cat 4 LBT process, and the X1 is a CWp in the Cat 4 LBT process, the CWp is the size of a contention window, the specific meaning of the CWp can be found in 3GPP TS36.213, section 15.

In one embodiment, at least one of the X detection value(s) not belonging to the X1 detection value(s) is lower than the first reference threshold.

In one embodiment, at least one of the X detection value(s) not belonging to the X1 detection value(s) is not lower than the first reference threshold.

In one embodiment, durations of any two of the X1 time sub-pools are equal.

In one embodiment, there are durations of at least two of the X1 time sub-pools being unequal.

In one embodiment, the X1 time sub-pool(s) comprises a latest one of the X time sub-pool(s).

In one embodiment, the X1 time sub-pool(s) only comprise(s) a slot duration in eCCA.

In one embodiment, the X time sub-pool(s) comprises (comprise) the X1 time sub-pool(s) and X2 time sub-pool(s), and any of the X2 time sub-pool(s) does not belong to the X1 time sub-pool(s); the X2 is a positive integer not greater than the X minus the X1.

In one subembodiment of the above embodiment, the X2 time sub-pool(s) comprises(comprise) a slot duration in an initial CCA.

In one subembodiment of the above embodiment, position(s) of the X2 time sub-pool(s) in the X time sub-pool(s) is(are) consecutive.

In one subembodiment of the above embodiment, a detection value of at least one of the X2 time sub-pool(s) is lower than the first reference threshold.

In one subembodiment of the above embodiment, a detection value corresponding to at least one of the X2 time sub-pool(s) is not lower than the first reference threshold.

In one subembodiment of the above embodiment, the X2 time sub-pool(s) comprises(comprise) all of slot durations in all of defer durations.

In one subembodiment of the above embodiment, the X2 time sub-pool(s) comprises(comprise) all of slot durations in at least one defer duration.

In one subembodiment of the above embodiment, the X2 time sub-pool(s) comprises(comprise) at least one additional slot duration.

In one subembodiment of the above embodiment, the X2 time sub-pool(s) comprises(comprise) all additional slot durations that are judged as non-idle through an energy detection and all slot durations in all additional defer durations in FIG. 14.

In one embodiment, the X1 time sub-pool(s) belongs (respectively belong) to X1 sub-pool set(s), and any of the X1 sub-pool set(s) comprises at least one time sub-pool in the X time sub-pool(s); a detection value corresponding to any time sub-pool in the X1 sub-pool set(s) is lower than the first reference threshold.

In one subembodiment of the above embodiment, a number of time sub-pool(s) comprised in at least one of the X1 sub-pool set(s) is equal to 1.

In one subembodiment of the above embodiment, a number of time sub-pools comprised in at least one of the X1 sub-pool set(s) is greater than 1.

In one subembodiment of the above embodiment, numbers of time sub-pool(s) comprised in at least two of the X1 sub-pool sets are unequal.

In one subembodiment of the above embodiment, there does not exist one of the X time sub-pool(s) simultaneously belonging to two of the X1 sub-pool sets.

In one subembodiment of the above embodiment, all time sub-pools in any of the X1 sub-pool set(s) belong to a same additional defer duration or an additional slot duration determined as idle through an energy detection.

In one subembodiment of the above embodiment, a detection value corresponding to at least one of the X time sub-pool(s) not belonging to the X1 sub-pool set(s) is lower than the first reference threshold.

In one subembodiment of the above embodiment, a detection value corresponding to at least one of the X time sub-pool(s) not belonging to the X1 sub-pool set(s) is not lower than the first reference threshold.

Embodiment 15

Figure 15:
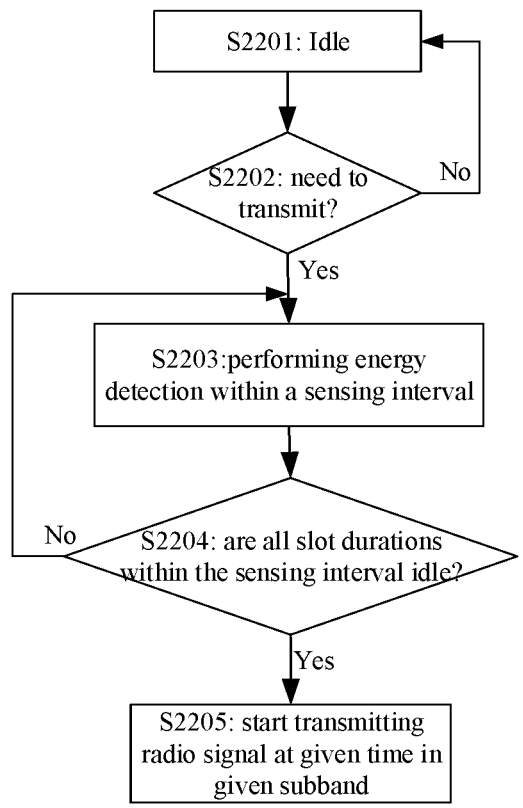
FIG. 15 illustrates a schematic diagram of a given access detection performed in a given frequency subband being used to determine whether a radio signal is transmitted at a given time in the given frequency subband according to another embodiment of the present disclosure.

Embodiment 15 illustrates another schematic diagram of a given access detection performed in a given frequency subband being used to determine whether a radio signal is transmitted at a given time in the given frequency subband, as shown in FIG. 15.

In Embodiment 15, the given access detection comprises performing Y energy detection(s) respectively in Y time sub-pool(s) in the given frequency subband to obtain Y detection value(s), Y being a positive integer; an end time of the Y time subpool(s) is not later the given time; the given access detection corresponds to one of the N access detections comprised in the channel access detection in the present disclosure, and the given frequency subband corresponds to one of the N frequency subbands used to perform the given access detection. The process of the given access detection can be described by the flowchart in FIG. 15.

In Embodiment 15, the UE in the present disclosure is in an idle state in step S2201, judges whether a transmission is required in step S2202; performs an energy detection in a sensing interval in step S2203; judges whether all slot durations in the sensing interval are idle in step S2204, if so, transmits a radio signal in the first frequency subband in step S2205; otherwise, returns to step S2203.

In Embodiment 15, a first given duration comprises at least one time sub-pool in the Y time sub-pool(s), and the first given duration is any duration in all sensing time comprised in FIG. 15; a second given duration comprises one of the Y1 time sub-pool(s), and the second given duration is judged as an idle sensing interval through energy detection.

In one embodiment, the specific meaning of the sensing interval can be found in 3GPP TS36.213, section 15.2.

In one embodiment, Y1 is equal to 2.

In one embodiment, Y1 is equal to Y.

In one embodiment, a sensing interval lasts 25 μs.

In one embodiment, a sensing interval comprises two slot durations, and the two slot durations are non-consecutive in time domain In one subembodiment of the above embodiment, a time interval between the two slot durations lasts 7 μs.

In one embodiment, the Y time sub-pool(s) comprises (comprise) a sensing interval in Category 2 LBT.

In one embodiment, the Y time sub-pool(s) comprises (comprise) a slot in a sensing interval in Type 2 UL channel access procedure, and the specific meaning of the sensing interval can be found in 3GPP TS36.213, section 15.2.

In one subembodiment of the above embodiment, the sensing interval lasts 25 μs.

In one embodiment, the Y time sub-pool(s) comprises (comprise) Tf and Tsl in a sensing interval in Type 2 UL channel access procedure, and the specific meanings of the Tf and Tsl can be found in 3GPP TS36.213, section 15.2.

In one subembodiment of the above embodiment, the Tf lasts 16 μs.

In one subembodiment of the above embodiment, the Tsl lasts 9 μs.

In one embodiment, a first time sub-pool in the Y1 time sub-pool(s) lasts 16 μs, a second time sub-pool in the Y1 time sub-pool(s) lasts 9 μs, Y1 being equal to 2.

In one embodiment, each of the Y1 time sub-pool(s) lasts 9 μs; a time interval between a first time sub-pool and a second time sub-pool in the Y1 time sub-pool(s) is 7 μs, Y1 being equal to 2.

Embodiment 16

Figure 16:
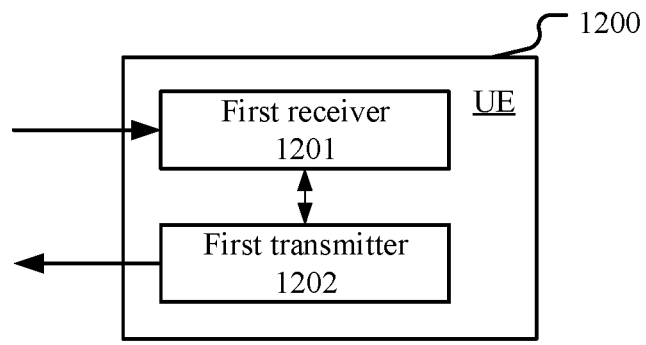
FIG. 16 illustrates a structure block diagram of a processing device in a UE according to one embodiment of the present disclosure.

Embodiment 16 illustrates the structure diagram of a processing device in a UE, as shown in FIG. 16. In FIG. 16, a UE processing device 1200 consists of a first receiver 1201 and a first transmitter 1202.

In one embodiment, the first receiver 1201 comprises the receiver 456, the receiving processor 452, the first processor 441 and the controller/processor 490 in Embodiment 4.

In one embodiment, the first receiver 1201 comprises at least first two of the receiver 456, the receiving processor 452, the first processor 441 and the controller/processor 490 in Embodiment 4.

In one embodiment, the first transmitter 1202 comprises the transmitter 456, the transmitting processor 455, the first processor 441 and the controller/processor 490 in Embodiment 4.

In one embodiment, the first transmitter 1202 comprises at first two of the transmitter 456, the transmitting processor 455, the first processor 441 and the controller/processor 490 in Embodiment 4.

The first receiver 1201 receives first information, the first information is used to indicate M frequency-domain resource blocks in N frequency subbands; performs a channel access detection on the N frequency subbands, the channel access detection is used to determine that $N_1$ frequency subband(s) out of the N frequency subbands is(are) idle;

The first transmitter 1202 transmits a first radio signal in $M_1$ frequency-domain resource block(s) in the $N_1$ frequency subband(s);

in Embodiment 16, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the first transmitter 1202 also transmits a second radio signal; herein, the second radio signal is used to carry a second power value; the first power value and the $N_1$ are used together to determine the second power value, or, the first power value and the $M_1$ are used together to determine the second power value.

In one embodiment, the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component.

In one embodiment, the second power value is linearly correlated with both the first power value and a first parameter; the $N_1$ and the N are used to determine the first parameter, or, the $M_1$ and the M are used to determine the first parameter.

In one embodiment, the first receiver 1201 also receives a first reference-signal group; herein, a measurement performed on the first reference-signal group is used to determine a second component, and the first power value is linearly correlated with the second component.

In one embodiment, the first receiver 1201 also receives second information; herein, the second information is used to indicate a linear coefficient of the first power value and the second component.

In one embodiment, the first receiver 1201 also receives R piece(s) of third information; herein, the R piece(s) of third information is(are respectively) used to indicate R first offset(s), a third component is linearly correlated with each of the R first offset(s), the first power value is linearly correlated with the third component, R being a positive integer.

Embodiment 17

Figure 17:
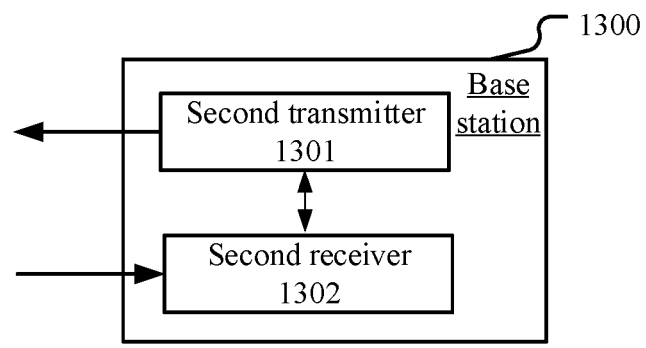
FIG. 17 illustrates a structure block diagram of a processing device in a base station according to one embodiment of the present disclosure.

Embodiment 17 illustrates a structure block diagram of a processing device in a base station, as shown in FIG. 17. In FIG. 17, a processing device 1300 in a base station consists of a second transmitter 1301 and a second receiver 1302.

In one embodiment, the second transmitter 1301 comprises the transmitter 416, the transmitting processor 415, a first processor and the controller/processor 440 in Embodiment 4.

In one embodiment, the second transmitter 1301 comprises at least first two of the transmitter 416, the transmitting processor 415, a first processor and the controller/processor 440 in Embodiment 4.

In one subembodiment, the second receiver 1302 comprises the receiver 416, the receiving processor 412, the first processor 471 and the controller/processor 440 in Embodiment 4.

In one subembodiment, the second receiver 1302 comprises at least first two the receiver 416, the receiving processor 412, the first processor 471 and the controller/processor 440 in Embodiment 4.

The second transmitter 1301 transmits first information, and the first information is used to indicate M frequency-domain resource blocks in N frequency subbands;

The second receiver 1302 receives a first radio signal in $M_1$ frequency-domain resource block(s) in the $N_1$ frequency subband(s);

in Embodiment 17, any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

In one embodiment, the second receiver 1302 also receives a second radio signal; herein, the second radio signal is used to carry a second power value; the first power value and the $N_1$ are used together to determine the second power value, or, the first power value and the $M_1$ are used together to determine the second power value.

In one embodiment, the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component.

In one embodiment, the second power value is linearly correlated with both the first power value and a first parameter; the $N_1$ and the N are used to determine the first parameter, or, the $M_1$ and the M are used to determine the first parameter.

In one embodiment, the second transmitter 1301 also transmits a first reference-signal group; herein, a measurement performed on the first reference-signal group is used to determine a second component, and the first power value is linearly correlated with the second component.

In one embodiment, the second transmitter 1301 also transmits second information; herein, the second information is used to indicate a linear coefficient of the first power value and the second component.

In one embodiment, the second transmitter 1301 also transmits R piece(s) of third information; herein, the R piece(s) of third information is(are respectively) used to indicate R first offset(s), a third component is linearly correlated with each of the R first offset(s), the first power value is linearly correlated with the third component, R being a positive integer.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) used for wireless communications, comprising:
   a first receiver, receiving first information, the first information being used to indicate M frequency-domain resource blocks in N frequency subbands; performing a channel access detection on the N frequency subbands, the channel access detection being used to determine that $N_1$ frequency subband(s) out of the N frequency subbands is(are) idle; and
   a first transmitter, transmitting a first radio signal in $M_1$ frequency-domain resource block(s) in the $N_1$ frequency subband(s);
   wherein any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

2. The UE according to claim 1, wherein the first transmitter also transmits a second radio signal; wherein the second radio signal is used to carry a second power value; the first power value and the $N_1$ are used together to determine the second power value, or, the first power value and the $M_1$ are used together to determine the second power value.

3. The UE according to claim 1, wherein the first power value is linearly correlated with a first component; the $N_1$ and the N are used to determine the first component; or, the $M_1$ and the M are used to determine the first component; or, the $M_1$ and a Subcarrier Spacing (SCS) of subcarriers occupied by the first radio signal are used to determine the first component;
   or, the first receiver also receives a first reference-signal group; wherein a measurement performed on the first reference-signal group is used to determine a second component, and the first power value is linearly correlated with the second component;
   or, the first receiver also receives R piece(s) of third information; wherein the R piece(s) of third information is(are respectively) used to indicate R first offset(s), a third component is linearly correlated with each of the R first offset(s), and the first power value is linearly correlated with the third component, R being a positive integer.

4. The UE according to claim 2, wherein the second power value is linearly correlated with the first power value and a first parameter; the $N_1$ and the N are used to determine the first parameter, or, the $M_1$ and the M are used to determine the first parameter.

5. The UE according to claim 1, wherein the first receiver also receives a first reference-signal group; wherein a measurement performed on the first reference-signal group is used to determine a second component, and the first power value is linearly correlated with the second component; the first receiver also receives second information; wherein the second information is used to indicate a linear coefficient of the first power value and the second component.

6. A base station for wireless communications, comprising:
   a second transmitter, transmitting first information, the first information being used to indicate M frequency-domain resource blocks in N frequency subbands; and
   a second receiver, receiving a first radio signal in $M_1$ frequency-domain resource block(s) in the $N_1$ frequency subband(s);
   wherein any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

7. The base station according to claim 6, wherein the second receiver also receives a second radio signal; wherein the second radio signal is used to carry a second power value; the first power value and the $N_1$ are used together to determine the second power value, or, the first power value and the $M_1$ are used together to determine the second power value.

8. The base station according to claim 6, wherein the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component;

or, the second transmitter also transmits a first reference-signal group; wherein a measurement performed on the first reference-signal group is used to determine a second component, and the first power value is linearly correlated with the second component, or, the second transmitter also transmits R piece(s) of third information; wherein the R piece(s) of third information is(are respectively) used to indicate R first offset(s), a third component is linearly correlated with each of the R first offset(s), the first power value is linearly correlated with the third component, R being a positive integer.

9. The base station according to claim 7, wherein the second power value is linearly correlated with the first power value and a first parameter; the $N_1$ and the N are used to determine the first parameter, or, the $M_1$ and the M are used to determine the first parameter.

10. The base station according to claim 6, wherein the second transmitter also transmits a first reference-signal group; wherein a measurement performed on the first reference-signal group is used to determine a second component, and the first power value is linearly correlated with the second component; the second transmitter also transmits second information; wherein the second information is used to indicate a linear coefficient of the first power value and the second component.

11. A method in a UE for wireless communications, comprising:
receiving first information, the first information being used to indicate M frequency-domain resource blocks in N frequency subbands;
performing a channel access detection on the N frequency subbands, the channel access detection being used to determine that $N_1$ frequency subband(s) out of the N frequency subbands is(are) idle; and
transmitting a first radio signal in $M_1$ frequency-domain resource block(s) in the $N_1$ frequency subband(s);
wherein any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

12. The method according to claim 11, comprising:
transmitting a second radio signal;
wherein the second radio signal is used to carry a second power value; the first power value and the $N_1$ are used together to determine the second power value, or, the first power value and the $M_1$ are used together to determine the second power value.

13. The method according to claim 11, wherein the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component;

or, comprising: receiving a first reference-signal group; wherein a measurement performed on the first reference-signal group is used to determine a second component, and the first power value is linearly correlated with the second component;

or, comprising: receiving R piece(s) of third information; wherein the R piece(s) of third information is(are respectively) used to indicate R first offset(s), a third component is linearly correlated with each of the R first offset(s), and the first power value is linearly correlated with the third component, R being a positive integer.

14. The method according to claim 12, wherein the second power value is linearly correlated with the first power value and a first parameter; the $N_1$ and the N are used to determine the first parameter, or, the $M_1$ and the M are used to determine the first parameter.

15. The method according to claim 11, comprising:
receiving a first reference-signal group; and
receiving second information;
wherein a measurement performed on the first reference-signal group is used to determine a second component, and the first power value is linearly correlated with the second component; and the second information is used to indicate a linear coefficient of the first power value and the second component.

16. A method in a base station for wireless communications, comprising:
transmitting first information, the first information being used to indicate M frequency-domain resource blocks in N frequency subbands; and
receiving a first radio signal in $M_1$ frequency-domain resource block(s) in the $N_1$ frequency subband(s);
wherein any of the M frequency-domain resource blocks belongs to one of the N frequency subbands, any of the N frequency subbands comprises at least one of the M frequency-domain resource blocks; the $M_1$ frequency-domain resource block(s) is(are) $M_1$ frequency-domain resource block(s) belonging to the $N_1$ frequency subband(s) in the M frequency-domain resource blocks; any two of the N frequency subbands are orthogonal, and any two of the M frequency-domain resource blocks are orthogonal in frequency domain; a first power value is used to determine transmit power of the first radio signal; the first power value is related to the $N_1$, or, the first power value is related to the $M_1$; N is a positive integer number greater than 1, M is a positive integer greater than 1, $N_1$ is a positive integer not greater than the N, and $M_1$ is a positive integer not greater than the M.

17. The method according to claim 16, comprising:
receiving a second radio signal;
wherein the second radio signal is used to carry a second power value; the first power value and the $N_1$ are used together to determine the second power value, or, the first power value and the $M_1$ are used together to determine the second power value.

18. The method according to claim 16, wherein the first power value is linearly correlated with a first component; the $N_1$ and the N are used to determine the first component; or, the $M_1$ and the M are used to determine the first component; or, the $M_1$ and an SCS of subcarriers occupied by the first radio signal are used to determine the first component;

or, comprising: transmitting a first reference-signal group; wherein a measurement performed on the first reference-signal group is used to determine a second component, and the first power value is linearly correlated with the second component, or, comprising: transmitting R piece(s) of third information; wherein the R piece(s) of third information is (are respectively) used to indicate R first offset(s), a third component is linearly correlated with each of the R first offset(s), and the first power value is linearly correlated with the third component, R being a positive integer.

19. The method according to claim 17, wherein the second power value is linearly correlated with the first power value and a first parameter; the $N_1$ and the N are used to determine the first parameter, or, the $M_1$ and the M are used to determine the first parameter.

20. The method according to claim 16, comprising:
transmitting a first reference-signal group; and
transmitting second information;
wherein a measurement performed on the first reference-signal group is used to determine a second component, and the first power value is linearly correlated with the second component; the second information is used to indicate a linear coefficient of the first power value and the second component.

* * * * *